United States Patent Office 3,557,158
Patented Jan. 19, 1971

1

3,557,158
6α-FLUORO-16-METHYL - 4 - PREGNENE 3,20-DIONES AND INTERMEDIATES PRODUCED IN THE SYNTHESIS THEREOF
Frank H. Lincoln, Kalamazoo, William P. Schneider, Kalamazoo Township, Kalamazoo County, and George B. Spero, Kalamazoo, Mich., assignors to The Upjohn Company, Kalamazoo, Mich., a corporation of Michigan
No Drawing. Continuation-in-part of applications Ser. No. 753,157, Aug. 4, 1958, and Ser. No. 800,090, Mar. 18, 1959. This application Jan. 22, 1962, Ser. No. 167,891
Int. Cl. C07c 169/32
U.S. Cl. 260—397.45
28 Claims

ABSTRACT OF THE DISCLOSURE

This invention relates to certain novel steroids, more particularly to 6α-fluoro-11β,17α,21-trihydroxy-16-methyl-4-pregnene-3,20-dione, 6α - fluoro - 17α,21 - dihydroxy-16-methyl - 4 - pregnene-3,11,20-trione, 6α-fluoro-11β,17α,21-trihydroxy - 16 - methyl - 1,4 - pregnadiene - 3,20 - dione, 6α - fluoro - 17α,21 - dihydroxy - 16 - methyl - 1,4 - pregnadiene-3,11,20-trione, the 9α-halo, especially the 9α-fluoro, compounds corresponding otherwise thereto, 21-esters of each, the corresponding 21-fluoro and 21-desoxy compounds, and intermediates in the production thereof.

This application is a continuation-in-part of application Ser. No. 753,157, filed Aug. 4, 1958, and Ser. No. 800,090, filed Mar. 18, 1959, now abandoned.

The novel compounds of this invention and a process for their production can be illustrated by the following formulae:

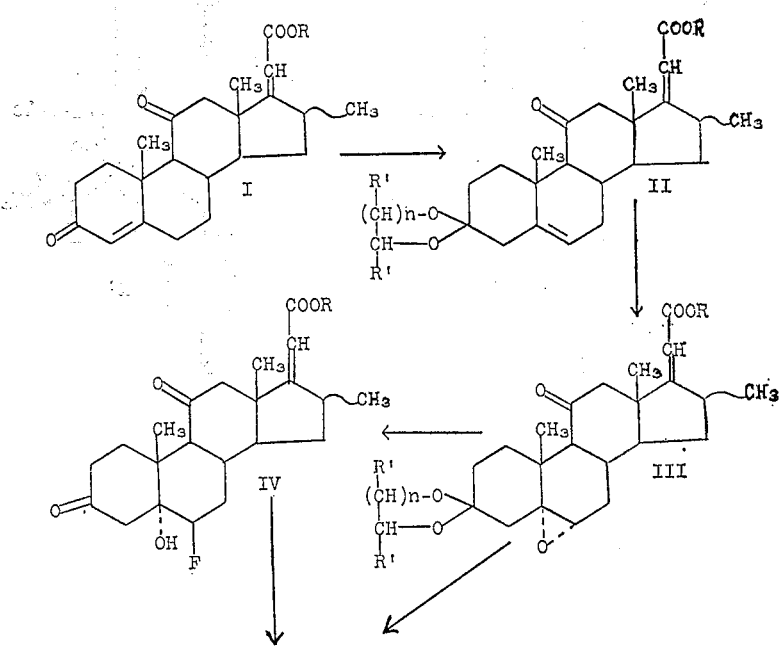

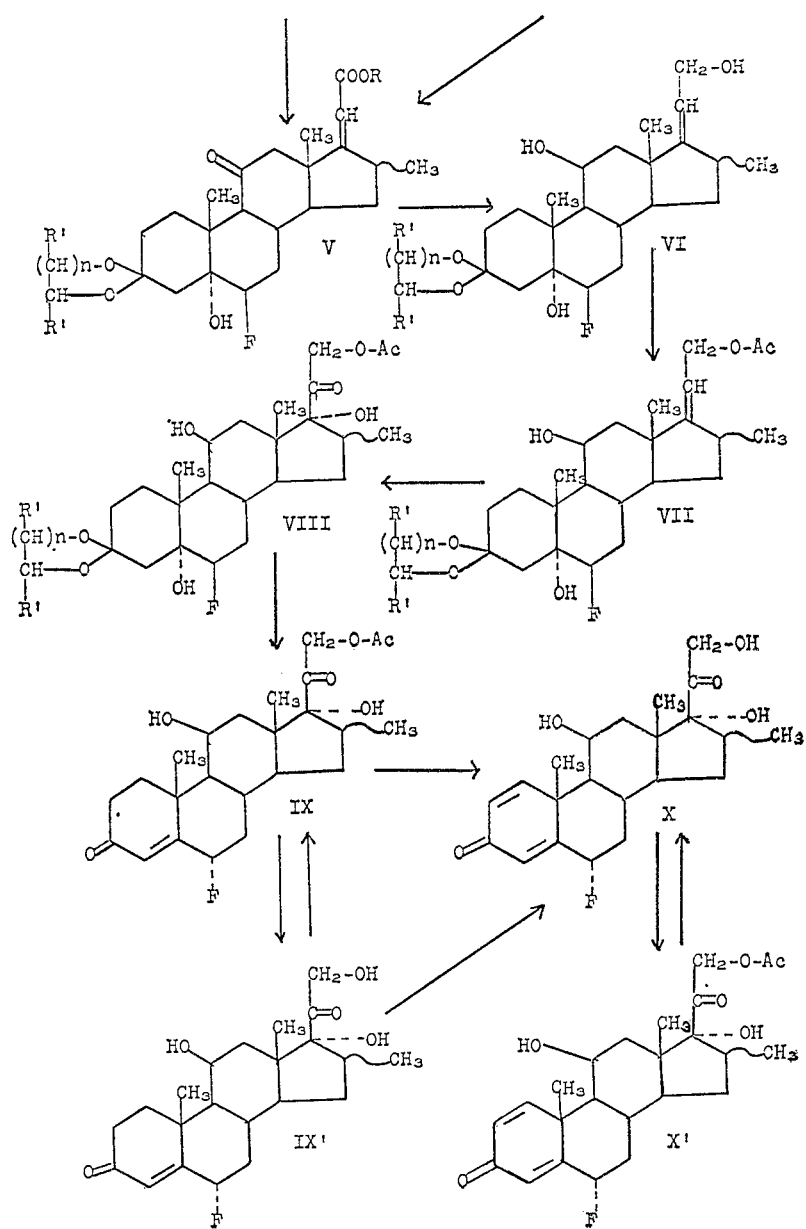

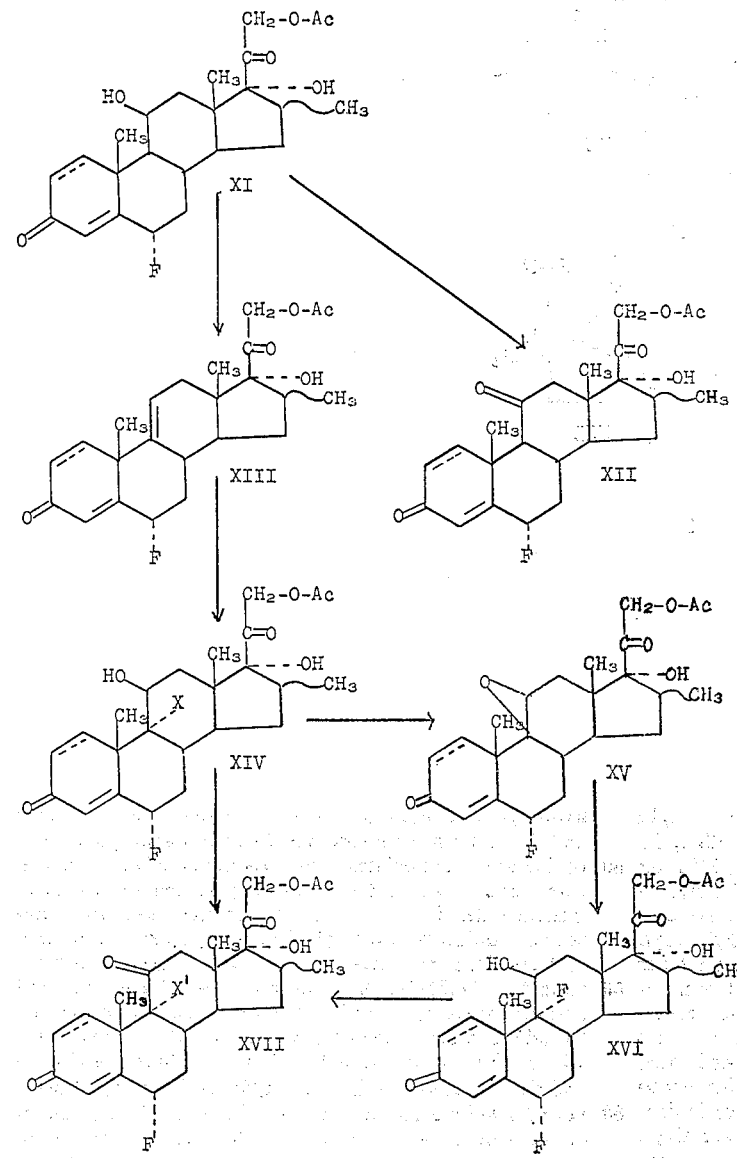

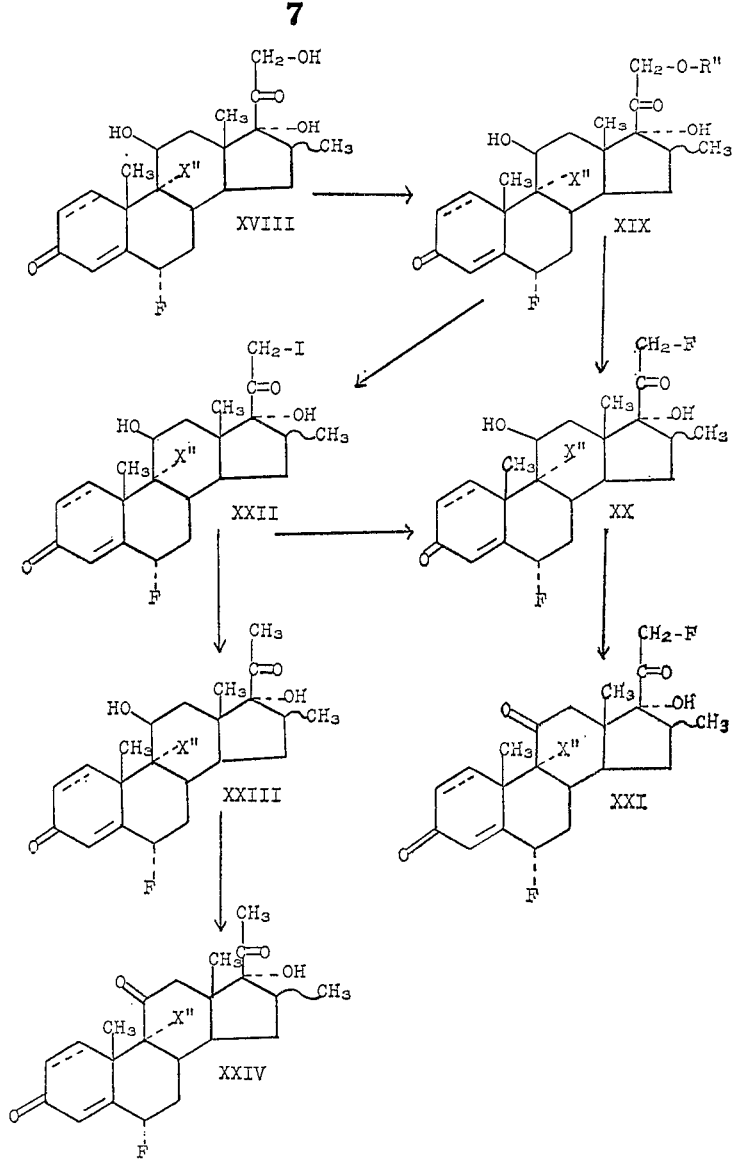

wherein R is lower-alkyl, i.e., containing from one to eight carbon atoms, inclusive, preferably methyl or ethyl, R' is hydrogen or lower-alkyl, preferably hydrogen, R" is an aryl or alkyl sulfonyl radical preferably that of a hydrocarbon sulfonic acid containing from one to twelve carbon atoms, inclusive, e.g., lower-alkyl, methyl, aryl, phenyl, p-tolyl, sym.-xylyl-sulfonic acid, $n$ is an integer from one to two. Ac is the acyl radical of a hydrocarbon carboxylic acid containing from one to twelve carbon atoms, inclusive, X is a halogen having an atomic weight from 35 to 127, inclusive, i.e., chlorine, bromine or iodine, X' is a halogen having an atomic weight from nineteen to 127, inclusive, i.e., fluorine, chlorine, bromine, or iodine, and X" is hydrogen, fluorine or chlorine. Lower-alkyl, wherever it appears means containing from one to eight carbon atoms, inclusive, e.g., methyl, ethyl, propyl, octyl. The dotted line appearing in Formulae XI to XXIV represents a $\Delta^1$-double bond which may or may not be present, i.e., the formulae represent both the $\Delta^4$ and $\Delta^{1,4}$-compounds. The wavy line employed in the above formulae and throughout the specification is a generic expression inclusive of the $\alpha$- and $\beta$-configuration and mixtures thereof.

It is an object of this invention to provide the 16α-epimers, as well as mixtures of the 16α- and 16β-epimers of the following novel compounds: 6α-fluoro - 11β,17α,21-trihydroxy-16-methyl-4-pregnene-3,20-dione and 21-esters thereof, 6α,9α-difluoro-11β,17α,21-trihydroxy-16-methyl-4-pregnene-3,20-dione, esters thereof and the 9α-bromo, 9α-iodo and 9α-chloro analogues thereof that are intermediates in the production of the 9α-fluoro compound, as well as the 9(11)-dehydro and 9β,11β-epoxy intermediates in the production of the 9α-fluoro compound, 6α-fluoro-16-methyl-17α,21-dihydroxy-4-pregnene-3,11,20-trione and 21-esters thereof, 6α,9α-difluoro-16-methyl - 17α,21-dihydroxy-4-pregnene-3,11,20-trione and 21-esters thereof, as well as the 9α-chloro, 9α-bromo and 9α-iodo analogues thereof, 6α-fluoro-11β,17α-dihydroxy-16 - methyl - 4-pregnene-3,20-dione, 6α-fluoro-9α-chloro- and 6α,9α - difluoro-11β,17α-dihydroxy-16-methyl-4-pregnene-3,20-dione and intermediates in the production thereof, 6α - fluoro - 16 - methyl - 17α-hydroxy-4-pregnene-3,11,20 - trione, 6α-γuoro-9α-chloro- and 6α,9α-difluoro-16 - methyl - 17α-hydroxy-4-pregnene-3,11,20-trione, 6α,21-difluoro - 11β,17α - dihydroxy-16-methyl-4-pregnene-3,20-dione, 6α,21 - difluoro - 9α - chloro and 6α,9α,21-trifluoro - 11β,17α - dihydroxy-16-methyl-4-pregnene-3,20-dione, and intermediates in the production thereof, 6α,21-difluoro - 16 - methyl - 17α-hydroxy-4-pregnene-3,11,20-trione, 6α,21 - difluoro - 9α - chloro- and 6α,9α,21-trifluoro - 16 - methyl - 17α-hydroxy-4-pregnene-3,11,20-trione and intermediates in the production of the above compounds, and the $\Delta^{1,4}$-analogues of each of the above compounds. It is another object to provide processes for the production thereof and pharmaceutical preparations and mixtures thereof. Other objects will be apparent to those skilled in the art to which this invention pertains.

The novel compounds of this invention, especially the 16α- and 16β-epimers and mixtures thereof of 6α-fluoro-11β,17α,21-trihydroxy-16-methyl-4-pregnene - 3,20-dione, 6α-fluoro-16-methyl - 17α,21 - dihydroxy - 4 - pregnene-3,11,20-trione, 6α-fluoro - 11β,17α,21 - trihydroxy - 16-methyl-1,4-pregnadiene-3,20-dione, 6α-fluoro-16-methyl-17α,21-dihydroxy-1,4-pregnadiene-3,11,20-trione, 6α,9α-difluoro-11β,17α,21-trihydroxy-16-methyl - 4 - pregnene-3,20-dione, 6α,9α-difluoro-16-methyl-17α,21-dihydroxy-4-pregnene-3,11,20-trione, 6α,9α - difluoro-11β,17α,21 - trihydroxy-16 - methyl - 1,4-pregnadiene-3,20-dione, 6α,9α-difluoro-16-methyl-17α,21 - dihydroxy-1,4 - pregnadiene-3,11,20-trione and their 21-esters as defined hereinabove, and the 21-desoxy-21-fluoro and 21-desoxy analogues thereof, are highly active anti-inflammatory agents with improved ratio of therapeutic activity to undesirable side-effects, e.g., gastrointestinal disturbances, salt retention, edema, etc., known to exist with similar know physiologically active steroids. Many of the higher molecular weight esters, particularly the ones resistant to hydrolysis and/or more insoluble in body fluids, provide compounds with prolonged activity over the corresponding 21-hydroxy compounds. The compounds named above are useful in the treatment of various inflammatory conditions of the skin, eyes, respiratory tract and the bones and internal organs due to bacterial or viral infections, contact dermatitis and allergic reactions, rheumatoid arthritis, and possess improved therapeutic ratios of anti-inflammatory activity to undesirable side-effects, compared to the corresponding compounds without the methyl group. For this purpose they may be incorporated in the various inert ointments, crems, lotions and sprays well known in the art. They may be combined with the known antibiotics, especially the penicillins, neomycin, tetracycline, chloromycetin and novobiocin. The 9α-chloro compounds of the present invention, while somewhat less active as anti-inflammatory agents than the corresponding 9α-fluoro compounds, often have a better therapeutic ratio of anti-inflammatory activity to undesirable side-effects, e.g., catabolic activity.

Other of the compounds of the present invention, as well as being useful as intermediates in the production of the above-described compounds also possess useful physiological activity, including glucocorticoid, mineralocorticoid and anti-inflammatory activity. Notable among these are compounds XIII, XIV and XV, and the corresponding 21-hydroxy compounds.

The novel compounds of the present invention are prepared from 3,11-diketo-16α-methyl-4,17(20)-[cis]-pregnadien-21-oic acid lower-alkyl ester (I) by the following reactions: While the following description relates to the preparation of the 16α-methyl compounds of the invention it is to be understood that the corresponding 16β-methyl compounds of the invention can be obtained by exactly the same series of reactions employing the 16β-epimer of the starting material (I). In like manner by employing as starting material a mixture of the 16α- and 16β-epimers of (I) there can be obtained a mixture of the 16α- and 16β-epimers of the various compounds of the invention which mixtures can, if desired, be separated into their components at any particular stage of the synthesis by conventional procedures, such as fractional crystallization, chromatography, counter-current distribution, and the like, or any combination thereof.

The 3-keto group of the 16α-epimer of (I) is ketalized according to the method of U.S. Pat. 2,707,184 or 2,758,993 to produce the 3-ketal of 3,11-diketo-16α-methyl-4,17(20)-[cis]-pregnadien-21-oic acid lower-alkyl ester (II). Ethylene glycol is the preferred ketalizing agent and the methyl and ethyl esters are preferred.

The next step of the process of this invention involves the epoxidation of the 5(6)-double bond of a 3-ketal of 3,11-diketo - 16α - methyl-4,17(20)-[cis]-pregnadien - 21-oic acid lower-alkyl ester with a peracid, e.g., peracetic or perbenzoic, or other known epoxidizing agents, to produce the corresponding 5,6-epoxide (III). A mixture of both the α- and β-epoxides is produced in this epoxidation reaction, and the mixture can be separated by chromatographic or crystallization techniques known in the art. The α-epoxide is employed in the next step.

The next step is an epoxide opening step in which a 3-ketalized 3,11-diketo-5α,6α-epoxy-16α-methyl-17(20)-[cis]-allopregnen-21-oic acid lower-alkyl ester (III), is reacted with hydrogen fluoride, to open the oxide ring and produce the corresponding 3-ketalized 3,11-diketo-5α-hydroxy-6β-fluoro - 16α - methyl - 17(20)-[cis]-allopregnen-21-oic acid lower-alkyl ester (V). This epoxide opening step is ordinarily carried out at temperatures between about minus forty and plus fifty degrees centigrade, the preferred limits being between about zero and 25 degrees centigrade. It can be performed under anhydrous conditions in the presence or absence of a catalyst, e.g., boron trifluoride, or under aqueous conditions in which case the ketal group is removed by hydrolysis. Reaction conditions, e.g., those disclosed by Schmidlin et al., Helv. Chim. Acta, 36, 1241 (1953); Gallagher, J. Biol. Chem. 162, 495 (1946); Cornforth et al., J. Chem. Soc., 1954, 907 and Fried et al., J. Am. Chem. Soc., 75, 2273 (1953), are usually employed. As anhydrous conditions are often difficult or inconvenient to maintain, the oxide opening reaction is preferably performed under aqueous conditions in which case the ketal group will be hydrolyzed at the same time to produce IV. The thus-produced 3-keto group of IV can then be reketalized in the manner described hereinabove to produce the corresponding ketal (V).

The next step of the process of the present invention is a reduction step in which a 3-ketalized 3-keto-5α-hydroxy - 6β - fluoro-16α-methyl-17(20)-[cis]-allopregnen-21-oic acid lower-alkyl ester (V), preferably the 3-ethylene glycol ketal of 3,11-diketo - 5α - hydroxy-6β-fluoro-16α-methyl-17(20)-[cis] - allopregnen - 21 - oic acid lower-alkyl, preferably methyl or ethyl, ester, is reduced with lithium aluminum hydride or other chemical carboxyl reducing agent in an organic solvent, e.g., ether, dioxane, tetrahydrofuran, benzene, to produce the corresponding 3-ketalized 5α,11β,21-trihydroxy - 6β - fluoro-16α - methyl-17(20)-[cis]-allopregnen-3-one. At completion of this reaction, the reaction mixture is preferably mixed with water or, an acid, an ester or carbonyl agent followed by water, to decompose any excess lithium aluminum hydride and organo-metal complexes. The usual reaction conditions for a lithium aluminum hydride reduction are employed, except that a reaction temperature at room temperature or below is preferred, and acid, though operative and satisfactory under carefully controlled conditions, is preferably not employed in the decomposition step, to avoid undue hydrolysis of the ketal group.

The next step is an esterification reaction involving the conversion of the 21-hydroxy group of a 3-ketal of 5α,11β,21 - trihydroxy - 6β - fluoro-16α-methyl-17(20)-[cis]-allopregnen-3-one (VI) to a 21-acyloxy group so as to protect the 21-hydroxy group in the next step, i.e., the oxidative hydroxylation step. This reaction can be performed under the esterification conditions known in the art, e.g., by the reaction of IV with the selected acid halide or acid chloride or acid bromide or the anhydride of a hydrocarbon carboxylic acid, or by reaction with the selected acid, in the presence of an esterification catalyst or with an ester under ester exchange reaction conditions. Reaction conditions which are apt to affect the labile 3-ketal group, the 11β-hydroxy group or the 6-fluoro group should be avoided.

In the next step of the process of this invention, the thus-produced ester (VII) is then oxidatively hydroxylated with osmium tetroxide and an oxidizing reagent, e.g., hydrogen peroxide, organic peracid, an amine oxide peroxide, or an aryl iodo oxide, in the manner described in U.S. Pats. 2,769,825, 2,769,823 or in Hogg et al., J. Am. Chem. Soc., 77, 4436 (1955), to produce the corresponding 3-ketal of 5α,11β,17α,21 - tetrahydroxy - 6β - fluoro-16α-methylallopregnane-3,20-dione 21-acylate (VIII).

The next step of the process of this invention involves the simultaneous removal of the 3-ketal group, the dehydration of the 5α-hydroxy group and the epimerization of the 6β-fluoro group of a 3-ketal of 5α,11β,17α,21-tetrahydroxy-6β-fluoro - 16α - methylallopregnane-3,20-dione 21-acylate to produce 6α-fluoro-11β,17α,21-trihydroxy - 16α - methyl - 4 - pregnene-3,20-dione 21-acylate (IX). Although these reactions can be performed in sequence, i.e., removal of the 3-ketal under mildly acidic conditions, the dehydration using Girards Reagent T and the epimerization using anhydrous mineral acid, these reactions are preferably performed simultaneously. This can be accomplished under acidic conditions, preferably employing a mineral acid in a lower-alkanol, preferably methanol or ethanol, and an inert solvent for the steroid, e.g., chloroform or methylene chloride.

The starting 3,11-diketo - 16α - methyl-4,17(20)-[cis]-pregnadien-21-oic methyl ester is prepared from the known 11-keto-16-dehydroprogesterone by the following reactions: The 3-keto group of 11-keto - 6 - dehydroprogesterone is selectively protected from reaction by conversion to a 3-enamine, e.g., pyrrolidyl enamine, according to procedures well known in the art. The 3-enamine of 11-keto-16-dehydroprogesterone is then reacted with a methyl Grignard reagent, preferably methyl magnesium bromide or iodide, in the presence of a 1,4-addition promoting reagent, e.g., cuprous chloride, [see "Grignard Reactions," Kharasch and Reinmuth, Prentice Hall, Inc., Publishers (1954), page 219, for a discussion of other catalysts], to produce the 3 - enamine of 11-keto-16α-methylprogesterone. The 3-enamine group is then hydrolyzed, e.g., with aqueous alkali to produce 11-keto-16α-methylprogesterone.

11-keto-16α-methylprogesterone is then converted to 3,11-diketo - 16α - methyl-4,17(20)-[cis]-pregnadien-21-oic acid lower-alkyl ester (I) in the manner described in U.S. Pat. 2,790,814 for the conversion of 11-keto-progesterone to 3,11-diketo - 4,17(20) - pregnadien-21-oic acid methyl ester, i.e., 11-keto-16α-methylprogesterone is reacted with more than two molar equivalents each of an alkyl diester of oxalic acid, preferably methyl or ethyl oxalate, and a base, preferably sodium methoxide or ethoxide or potassium tertiary butoxide, to produce the alkali-metal dienolate of 2,21-dialkoxyoxalyl-11-keto-16α-methylprogesterone. This compound, or the free enol, e.g., prepared by reaction of the alkali-metal dienolate with acetic acid, is then trihalogenated with chlorine or bromine, preferably the latter, to produce 2-21-dialkoxy-oxalyl-2,21,21 - trihalo - 11 - keto-16α-methyprogesterone. This compound rearranges with strong base, e.g., an alkali-metal alkoxide, in the presence of an alkanol, e.g., sodium methoxide or ethoxide in methanol or ethanol, to produce 2-halo - 3,11 - diketo-16α-methyl-4,17(20)-[cis]-pregnadien-21-oic acid alkyl ester. The 2-halo group is removed by zinc and acetic acid or other halogen removing agent to produce 3,11-diketo - 16α - methyl-4,17(20)-[cis]-pregnadien-21-oic acid alkyl ester (I).

The starting 3,11-diketo - 16β - methyl-4,17(20)-[cis]-pregnadien-21-oic acid methyl ester is prepared from the known 16β-methylprogesterone [J. Romo et al., Bol. Inst. Quim. Univ. N. Auton. Mex., IV, 125 (1952); C.A. 9400a (1954)], by the following reactions: 16β-methylprogesterone is bioconverted with a species of fungus capable of introducing an 11α-hydroxy group, i.e., Rhizopus arrihizus or Rhizopus nigricans, to produce 11α-hydroxy - 16β - methylprogesterone. This compound is oxidized, e.g., with sodium dichromate or an N-halo-amide or N-haloimide to give 11-keto-16β-methylprogesterone.

11-keto - 16β - methylprogesterone is then converted to 3,11-diketo - 16β - methyl-4,17(20)-[cis]-pregnadien-21-oic acid lower-alkyl ester (I) in the manner described for the conversion of 11-keto-16α-methylprogesterone to 3,11-diketo-16α-methyl - 4,17(20) - [cis] - pregnadien-21-oic acid lower-alkyl ester (I).

6α - fluoro - 11β,17α,21 - trihydroxy-16α-methyl-4-pregnene-3,20-dione (IX') or its 21-acylate (IX) preferably the 21-acetate, can be converted to numerous physiologically active steroids. For example, it can be dehydrogenated in the one position with selenium dioxide or a fungus capable of dehydrogenating at the one position without otherwise degrading the nucleus, e.g., of the genus Septomyxa, to produce 6α-fluoro-11β,17α,21-trihydroxy-16α-methyl-1,4-pregnadiene-3,20-dione (X). This compound, in turn, can be esterified to produce its 21-esters (X') according to methods known in the art.

6α - fluoro - 11β,17α,21 - trihydroxy-16α-methyl-4-pregnene-3,20-dione 21-acylate (IX) and 6α-fluoro-11β,17α, 21 - trihydroxy - 16α - methyl-1,4-pregnadiene-3,20-dione 21-acylate (X'), represented collectively by Formula XI, can be oxidized with a N-haloamide or N-haloimide, e.g., N-bromoacetamide in pyridine or like amine, or with chromic acid or sodium dichromate, according to methods known in the art, to produce the corresponding 11-keto compounds (XII) which, in turn, can be hydrolyzed in the manner described herein to produce the corresponding 21-hydroxy compounds.

The 6α,9α-dihalo compounds of the present invention are prepared as follows: dehydrating a 6α-fluoro-11β,17α, 21 - trihydroxy - 16α - methyl-1,4-pregnadiene-3,20-dione 21-acylate or a 6α-fluoro-11β,17α,21-trihydroxy-16α-methyl-4-pregnene-3,20-dione 21-acylate (XI), illustratively with sulfuric acid or preferably with an N-haloamide followed by anhydrous sulfur dioxide, produces the corresponding 6α-fluoro-16α-methyl-17α,21-dihydroxy-1,4, 9(11)-pregnatriene-3,20-dione 21-acylate and 6α-fluoro-16α - methyl - 17α,21 - dihydroxy-4,9(11)-pregnadiene-3, 20-dione 21-acylate, respectively (XIII). Addition of a hypohalous acid, i.e., hypochlorous, hypoiodous or hypobromous acid, to these latter compounds produces the corresponding 6α-fluoro-9α-halo - 11β,17α,21 - trihydroxy-16α-methyl-1,4-pregnadiene-3,20-dione 21-acylate and 6α-fluoro - 9α-halo-11β,17α,21-trihydroxy-16α-methyl-4-pregnene-3,20-dione 21-acylate, respectively (XIV), which by treatment with a base, e.g., anhydrous potassium acetate, yields the corresponding epoxy compounds (XV), i.e., 6α - fluoro - 9β,11β - epoxy-16α-methyl-17α,21-dihydroxy-1,4-pregnadiene-3,20-dione 21-acylate and 6α-fluoro-9β, 11β-epoxy-16α-methyl-17α,21-dihydroxy - 4 - pregnene - 3, 20-dione 21-acylate, respectively. Treatment of these epoxy compounds with hydrogen fluoride or other hydrogen fluoride releasing agents produces the highly active 6α,9α-difluoro-11β,17α,21-trihydroxy-16α-methyl-1, 4-pregnadiene-3,20-dione 21-acylate and 6α,9α-difluoro-11β,17α,21-trihydroxy-16α-methyl-4-pregnene-3,20 - dione 21-acylate, respectively (XVI). Oxidation of these latter compounds, preferably the 21-acetate, with chromic acid in acetic acid provides 6α,9α-difluoro-16α-methyl-17α,21-dihydroxy-1,4-pregnadiene-3,20-dione 21-acylate and 6α, 9α - difluoro - 16α-methyl-17α,21-dihydroxy-4-pregnene-3, 11,20-trione 21-acylate, respectively (XVII). Hydrolysis of the esters XVII with a base, e.g., aqueous sodium hydroxide or sodium bicarbonate, provides the free alcohols 6α,9α-difluoro-16α-methyl-17α,21-dihydroxy-1,4-pregnadiene-3,11,20-trione and 6α,9α-difluoro-16α-methyl-17α,21-dihydroxy-4-pregnene-3,11,20-trione. The esters of XVI are similarly hydrolyzed to the corresponding 21-hydroxy compounds.

The 6α,21-difluoro compounds of the present invention are prepared by treating 6α-fluoro-11β,17α,21-trihydroxy-16α-methyl-1,4-pregnadiene-3,20-dione and 6α-fluoro-11β, 17α,21-trihydroxy-16α-methyl-4-pregnene-3,20-dione, respectively, (XVIII) or the corresponding 11-keto compounds or their 9α-chloro or 9α-fluoro analogues with an organic sulfonyl halide such as methanesulfonyl chloride, toluenesulfonyl chloride, toluenesulfonyl bromide, benzenesulfonyl chloride, naphthylenesulfonyl chloride, or the like, to obtain the corresponding 21-sulfonate ester (XIX), e.g., 6α-fluoro-11β,17α,21-trihydroxy-16α-methyl-4-pregnene-3,20-dione 21-methylsulfonate or 21-p-toluenesulfonate or their 9α-chloro or 9α-fluoro analogues; treating the thus-produced 21-alkyl or aryl sulfonate with sodium iodide in acetone solution to obtain the corresponding 21-iodo compounds (XXII), e.g., 6α-fluoro-11β,17α - dihydroxy - 16α - methyl-21-iodo-1,4-pregnadiene-3,20-dione and 6α-fluoro-11β,17α-dihydroxy-16α-methyl-21-iodo-4-pregnene-3,20-dione or their 9α-fluoro or 9α-chloro analogues; treating the thus-obtained 21-iodo compounds with silver fluoride, preferably in acetonitrile solution to obtain the corresponding 21-fluoro compound (XX), e.g., 6α,21 - difluoro - 11β,17α-dihydroxy-16α-methyl-1,4-pregnadiene-3,20-dione and 6α,21-difluoro-11β,17α-dihydroxy-16α-methyl-4-pregnene-3,20-dione or their 9α-fluoro or 9α-chloro analogues; and if desired oxidizing the thus-obtained 21-fluoro compounds with chromic anhydride, N-bromoacetamide, N-bromosuccinimide, or the like, to give the corresponding 11-keto compounds (XXI), e.g., 6α,21-difluoro-16α-methyl-17α-hydroxy-1,4-pregnadiene-3,11,20-trione and 6α,21-difluoro-16α-methyl-17α-hydroxy-4-pregnene-3,11,20-trione or their 9α-fluoro or 9α-chloro analogues. Alternatively, the 21-sulfonate, preferably the 21-methylsulfonate, can be treated directly with potassium fluoride in dimethyl sulfoxide, e.g., at 100 degrees for eighteen hours or longer, to produce the 6α,21-difluoro compounds directly. The corresponding 11-keto analogues of these compounds, prepared by oxidizing the 11β-hydroxy group of a compound represented by Formula XIX, are similarly converted from their 21-sulfonate ester directly to the 21-fluoro compounds.

The 21-unsubstituted compounds of the present invention (XXIII, XIV), are prepared by treating a 21-iodo compound (XXII), e.g., 6α-fluoro-11β,17α-dihydroxy-16α-methyl-21-iodo-1,4-pregnadiene-3,20-dione and 6α-fluoro - 11β,17α - dihydroxy - 16α-methyl-21-iodo-4-pregnene-3,20-dione, with a reducing agent such as sodium thiosulfate, sodium bisulfite, potassium bisulfite, or the like, in an aqueous organic solvent mixture, to obtain the corresponding 21-unsubstituted compound (XXIII) and if desired oxidizing the thus-obtained 21-unsubstituted compound with chromic anhydride, N-bromoacetamide, N-bromosuccinimide, or the like, to give the corresponding 11-keto compound (XXIV), e.g., 6α-fluoro-16α-methyl - 17α - hydroxy-1,4-pregnadiene-3,11,20-trione and 6α-fluoro-16α-methyl-17α-hydroxy - 4 - pregnene - 3,11,20-trione. The 9α-chloro and 9α-fluoro-21-unsubstituted compounds (XXIII, XXIV, X″=Cl, F) are prepared by substituting the corresponding 9α-halo-21-iodo compounds (XXII, X″=Cl, F) as starting compounds in the above-described reaction or converting the 9-hydrogen compounds to 9α-chloro and 9α-fluoro compounds via the 9(11)-dehydro compound in the manner described hereinbefore.

The following preparations and examples are illustrative of the products are processes of this invention, but are not to be construed as limiting.

PREPARATION 1

*11-keto-16α-methylprogesterone*

To a hot solution of 4.56 grams (0.014 mole) of 11-keto-16-dehydroprogesterone in 45 milliliters of methanol was added 2.25 milliliters of pyrrolidine with swirling. The reaction product, the 3-pyrrolidyl enamine of 11-keto-16-dehydroprogesterone, soon separated as yellowish crystals. After cooling to five degrees, the mixture was filtered, the cake washed with cold methanol and dried under vacuum. There was obtained 4.56 grams of 3-pyrrolidyl-3,5,16-pregnatriene-11,20-dione melting at 154 to 169 degrees centigrade.

A solution of the thus-obtained enamine in 110 milliliters of tetrahydrofuran was added slowly to a stirred suspension of 45 milliliters of commercial three molar methyl magnesium bromide, 0.90 gram of cuprous chloride and fifty milliliters of tetrahydrofuran. The mixture was cooled to room temperature and stirred under a nitrogen atmosphere for three hours. The excess Grignard reagent was cautiously destroyed by the dropwise addition of 6.5 milliliters of water. To the mixture, containing 3-pyrrolidyl-16α-methyl-3,5 - pregnadiene - 11,20-dione, was added four milliliters of acetic acid and sixteen milliliters of methanol and the mixture was warmed until a clear dark yellow solution was obtained. Sixteen milliliters of a ten percent aqueous solution of sodium hydroxide was added, bringing the pH to 8. The mixture was heated under reflux for 45 minutes. One milliliter of acetic acid and 250 milliliters of water were added and the cooled mixture was extracted three times with methylene chloride. The combined extracts were washed with aqueous sodium bicarbonate solution, water and then dried with sodium sulfate. The dried solution was evaporated and the residue, consisting essentially of 11-keto-16α-methylprogesterone, was dissolved in 400 milliliters of methylene chloride and chromatographed through a 200-gram column of magnesium silicate (Florisil). The column was developed with 400-milliliter portions of solvent of the following composition and order: five of hexanes (Skellysolve B) plus three percent acetone, five of hexanes plus five percent acetone, eight of hexanes plus seven percent acetone, five of hexanes plus ten percent acetone, four of hexanes plus fifteen percent acetone and finally, one of acetone. Fractions 9 to 25 (counting the methylene chloride fraction) were combined and recrystallized from a mixture of acetone and water to give 2.03 grams of 11-keto-16α-methylprogesterone melting at 179 to 182 degrees centigrade. A sample recrystallized from a mixture of ethyl acetate and hexanes melted at 183 to 185 degrees centigrade, had an $[\alpha]_D$ of plus 255 degrees ($CHCl_3$), $$\lambda^{alc.}_{max.} \text{ m}\mu \text{ a}_M \ 15{,}850$$

and the analysis below.

Calc'd for $C_{22}H_{30}O_3$ (percent): C, 77.15; H, 8.83. Found (percent): C, 76.95; H, 8.98.

PREPARATION 2

*3,11-diketo-16α-methyl-4,17(20)-[cis]-pregnadien-21-oic acid methyl ester*

A solution of 2.00 grams (5.8 millimoles) of 11-keto-16α-methylprogesterone in thirty milliliters of dry tertiary butyl alcohol was warmed to fifty degrees centigrade and stirred under nitrogen. To the solution was added 3.2 milliliters of ethyl oxalate and 3.03 grams of a 25 percent methanolic sodium methoxide solution. A yellow-green precipitate of the sodium dienolate of 2,21-diethoxyoxalyl-11-keto-16α-methylprogesterone appeared almost immediately.

The mixture was stirred for twenty minutes after which a cooled solution of 0.98 gram of anhydrous sodium acetate and 0.84 milliliter of acetic acid in forty milliliters of methanol was added, thus producing the free dienol. The solution was cooled to zero degrees centigrade and then treated dropwise with a cold solution of 2.0 grams of bromine in methanol over a period of ten minutes. There was thus-produced 2,21,21-tribromo-2,21-diethoxyoxalyl-11-keto-16α-methylprogesterone.

The cooling bath was removed and to the solution was added 5.72 grams of a 25 percent methanolic sodium methoxide solution. The stirring was continued for 2.5 hours. There was thus produced 2-bromo-3,11-diketo-16α-methyl-4,17(20)-[cis]-pregnadien - 21 - oic acid methyl ester.

To the resulting solution was then added five milliliters of acetic acid and one gram of zinc dust and stirring was continued for thirty minutes. The mixture was diluted with water, the solids were removed by filtration, and the filtrate extracted thoroughly with methylene chloride. The extract was dried with sodium sulfate and evaporated. The residue was dissolved in 400 milliliters of methylene chloride and poured over a 200-gram column of magnesium silicate (Florisil). The column was developed with 400-milliliter portions of solvent of the following composition and order: four of hexanes (Skellysolve B) plus five percent acetone, ten of hexanes plus seven percent acetone, ten of hexanes plus ten percent acetone and finally, one of acetone. Fractions 14 to 23 (counting the methylene chloride fraction) contained starting 11 - keto-16α-methyl-progesterone. Fractions 7 to 12 contained 3,11-diketo-16α-methyl-4,17(20)-[cis]-pregnadien-21-oic acid methyl ester which, when crystallized from methanol and water and then from methanol, melted at 177 to 184 degrees centigrade, has a $$\lambda_{max}^{alc.} \ 232.5 \ m\mu, \ a_M \ 26,200$$

an $[\alpha]_D$ of plus 137 degrees (CHCl$_3$) and the analysis below.

Calc'd for $C_{23}H_{30}O_4$ (percent): C, 74.56; H, 8.16. Found (percent): C, 74.58; H, 8.04.

The yield of product is increased if the initial reaction of 11-keto-16α-methylprogesterone with ethyl oxalate and sodium methoxide is conducted at somewhat higher temperatures and/or with longer reaction times.

PREPARATION 3

*11-keto-16β-methylprogesterone*

A medium was prepared containing ten grams of Cerelose dextrose technical grade and twenty grams of corn steep liquor (sixty percent solids) in sufficient tap water to make up one liter of solution. One hundred liters of such a medium was adjusted by the addition of 25 percent sodium hydroxide solution to a pH of 5. Thereto was then added 400 milliliters of lard oil and lard-oil octadecanol as an anti-foaming agent. This medium was sterilized for 45 minutes at twenty pounds pressure and inoculated with Rhizopos nigricans minus strain, American Type Culture Collection No. 6227b, and incubated for 24 hours at a temperature of 28 degrees centigrade using a rate of aeration and stirring such that the oxygen uptake was 6.3 to seven millimoles per hour per milliliter of sodium sulfite according to the method of Cooper, Fernstrom and Miller, Ind. Eng. Chem. 36, 504 (1944). To this medium containing a 24-hour growth of Rhizopus nigricans minus strain was added six grams of 16β-methylprogesterone in 150 milliliters of acetone to provide a suspension of the steroid in the culture. After an additional 24-hour period of incubation under the same conditions of temperature and aeration, the beer and mycelium were extracted. The mycelium was filtered, washed twice each time with a volume of acetone approximately equal to the volume of the mycelium, and extracted twice, each time with a volume of methylene chloride approximately equal to the volume of the mycelium. The acetone and methylene chloride extracts including solvents were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvent then evaporated. The crude 16β-methyl-11α-hydroxyprogesterone was oxidized directly to 16β-methyl-11-ketoprogesterone.

A solution was prepared containing 3.5 grams of the crude 16β-methyl-11α-hydroxyprogesterone in 240 milliliters of acetic acid at room temperature. Thereto was added drop-wise a solution of 0.82 gram of chromium trioxide in 82 milliliters of acetic acid and 0.8 milliliter of water. During the addition the temperature was maintained between twenty to 23 degrees centigrade and thereafter for another period of one and one-half hours. The reaction mixture was then diluted with one liter of water and extracted with six 150-milliliter portions of methylene chloride. The extracts were combined, washed with dilute sodium bicarbonate solution and water, dried over anhydrous sodium sulfate and evaporated to dryness under reduced pressure. The thus obtained 16β-methyl-11-ketoprogesterone was recrystallized from methanol.

PREPARATION 4

*3-11-diketo-16β-methyl-4,17(20)-[cis]-pregnadien-21-oic acid methyl ester*

A solution of 2.00 grams (5.8 millimoles) of 11-keto-16β-methylprogesterone in thirty milliliters of dry tertiary butyl alcohol was warmed to fifty degrees centigrade and stirred under nitrogen. To the solution was added 3.2 milliliters of ethyl oxalate and 3.03 grams of a 25-percent methanolic sodium methoxide solution. A yellow-green precipitate of the sodium dienolate of 2,21-diethoxyoxalyl-11-keto-16β-methylprogesterone appeared almost immediately.

The mixture was stirred for twenty minutes after which a cooled solution of 0.98 gram of anhydrous sodium acetate and 0.84 milliliter of acetic acid in forty milliliters of methanol was added, thus producing the free dienol. The solution was cooled to zero degrees centigrade and then treated dropwise with a cold solution of 2.0 grams of bromine in methanol over a period of ten minutes. There was thus produced 2,21,21-tribromo-2,21-diethoxyoxalyl-11-keto-16β-methylprogesterone.

The cooling bath was removed and to the solution was added 5.72 grams of a 25 percent methanolic sodium methoxide solution. The stirring was continued for 2.5 hours. There was thus produced 2-bromo-3,11-diketo-16β-methyl-4,17(20)-[cis]-pregnadien-21-oic acid methyl ester.

To the resulting solution was then added five milliliters of acetic acid and one gram of zinc dust and stirring was continued for thirty minutes. The mixture was diluted with water, the solids were removed by filtration, and the filtrate extracted thoroughly with methylene chloride. The extract was dried with sodium sulfate and evaporated. The residue was dissolved in 400 milliliters of methylene chloride and poured over a 200-gram column of magnesium silicate (Florisil). The column was developed with 400-milliliter portions of solvent of the following composition and order: four of hexanes (Skellysolve B) plus five percent acetone, ten of hexanes plus seven percent acetone, ten of hexanes plus ten percent acetone and finally, one of acetone. Fractions 14 to 23 (counting the methylene chloride fraction) contained starting 11-keto-16β-methylprogesterone. Fractions 7 to 12 contained 3,11-diketo-16β-methyl-4,17(20)-[cis]-pregnadien-21 - oic acid methyl ester.

The yield of product is increased if the initial reaction of 11-keto-16β-methylprogesterone with ethyl oxalate and sodium methoxide is conducted at somewhat higher temperatures and/or with longer reaction times.

Examples showing the preparation of the 16α-methyl compounds of the invention:

EXAMPLE 1

*The 3-ethylene glycol ketal of 3,11-diketo-16α-methyl-4, 17(20)-[cis]-pregnadien-21-oic acid methyl ester*

To a solution of 1.5 grams of 3,11-diketo-16α-methyl-4,17(20)-[cis]-pregnadien-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The water formed in the reaction was removed by passing the condensate through a water trap. The cooled reaction mixture was washed with 100 milliliters of a one percent aqueous sodium bicarbonate solution. The benzene layer was then poured on a column of 150 grams of magnesium silicate (Florisil). The column was developed with 100-milliliter portions of solvent of the following composition and order: eight portions of methylene chloride plus four percent acetone and three portions of methylene chloride plus eight percent acetone. The methylene chloride plus four percent acetone eluates contained the 3-ethylene glycol ketal of 3,11-diketo-16α-methyl-4,17(20)-[cis]-pregnadien-21-oic acid methyl ester which was freed of solvent by evaporation.

Reacting 3,11-diketo-16α-methyl - 4,17(20) - [cis]-pregnadien-21-oic acid methyl ester with trimethylene glycol in the presence of para-toluenesulfonic acid is productive of the 3-trimethylene glycol ketal of 3,11-diketo-16α - methyl-4,17(20)-[cis]-pregnadien - 21 - oic acid methyl ester.

Similarly, other 3-ketals of this and other esters of 3,11 - diketo - 16α - methyl - 4,17(20) - [cis] - pregnadien-21-oic acid methyl ester are produced by the reaction of the selected ester of 3,11 - diketo-16α-methyl-4,17(20)-[cis]-pregnadien-21-oic acid, e.g., methyl, ethyl, propyl, butyl, or octyl ester, with a glycol as hereinbefore described, e.g., ethylene glycol, propylene glycol, trimethylene glycol, lower-alkyl substituted ethylene glycols or trimethylene glycols, in the presence of an acid catalyst, e.g., paratoluenesulfonic acid, hydrogen chloride, sulfuric acid.

EXAMPLE 2

3-ethylene glycol ketal of 3,11-diketo-5α,6α-epoxy-16α-methyl-17(20)-[cis]-pregnen-21-oic acid methyl ester To a solution of five grams of the 3-ethylene glycol ketal of 3,11-diketo-16α-methyl - 4,17(20) - [cis]-pregnadien-21-oic acid methyl ester in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of the 3-ethylene glycol ketal of 3,11-diketo - 5α,6α - epoxy - 16α - methyl-17(20)-[cis]-pregnen-21-oic acid methyl ester.

EXAMPLE 3

3,11-diketo-5α-hydroxy-6α-fluoro-16α-methyl-17(20)-allopregnen-21-oic acid methyl ester To a solution of 1.73 grams of 3-ethylene glycol ketal of 3,11-diketo-5α,6α-epoxy-16α - methyl - 17(20)-[cis]-pregnen-21-oic acid methyl ester in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography over magnesium silicate gave two fractions. The first was eluted with methylene chloride plus five percent acetone and the second was eluted with methylene chloride plus ten and twenty percent acetone. Crystallization of the first fraction from a mixture of acetone and Skellysolve B hexanes gave 3,11-diketo-5α-hydroxy - 6β - fluoro - 16α-methyl-17(20)-allopregnen-21-oic acid methyl ester.

EXAMPLE 4

3-ethylene glycol ketal of 3,11 - diketo - 5α - hydroxy-6β-fluoro-16α-methyl - 17(20) - [cis] - allopregnen - 21-oic acid methyl ester A mixture of 1.9 grams of 6β-fluoro-3,11-diketo-5α-hydroxy-16α-methyl-17(20) - [cis] - allopregnen-21-oate, 59 milligrams of para-toluenesulfonic acid monohydrate and 31 milliliters of distilled ethylene glycol was added to 800 milliliters of benzene. The mixture was stirred and refluxed for two hours, with the condensate passing through a water trap to remove the water. Then the mixture was cooled, washed with water and evaporated to dryness to give a crude solid which on recrystallization from a mixture of acetone and hexanes gave the 3-ethylene glycol ketal of 3,11-diketo-5α-hydroxy-6β-fluoro-16α-methyl-17-(20)-[cis]-allopregnen-21-oic acid methyl ester.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of 3,11-diketo-5α-hydroxy-6β-fluoro - 16α - methyl - 17(20)-allopregnen-21-oic acid methyl ester.

EXAMPLE 5

The 3-ethylene glycol ketal of 5α,11β,21-trihydroxy-6β-fluoro-16α-methyl-17(20)-[cis]-allopregnen-3-one To a solution of 1.96 grams of the 3-ethyleneglycol ketal of 3,11-diketo-5α-hydroxy-6β-fluoro-16α-methyl-17(20)-[cis]-allopregnen-21-oic acid methyl ester in 850 milliliters of anhydrous ether was added 3.7 grams of lithiumaluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give the 3-ethylene glycol ketal of 5α,11β,21-trihydroxy-6β-fluoro-16α-methyl - 17(20) - [cis] - allopregnen-3-one.

EXAMPLE 6

The 3-ethylene glycol ketal of 5α,11β,21-trihydroxy-6β-fluoro - 16α - methyl-17(20)-[cis]-allopregnen - 3 - one 21-acetate 0.87 gram of the 3-ethylene ketal of 5α,11β,21-trihydroxy-6β-fluoro-16α-methyl-17(20)-[cis]-allopregnen - 3-one was dissolved in ten milliliters of acetic anhydride and ten milliliters of pyridine. The solution was maintained sixteen hours at room temperature and then poured into ice water to give the 3-ethylene glycol ketal of 5α,11β,21-trihydroxy-6β-fluoro-16α - methyl - 17(20)-[cis]-allopregnen-3-one 21-acetate.

Similarly, other 21-organic carboxylic acid esters of 5α,11β,21-trihydroxy-6β-fluoro-16α-methyl-17(20) - [cis]-allopregnen-3-one 3-ethylene ketals can be prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting the 3-ethylene ketal of 5α,11β,21-trihydroxy-6β-fluoro-16α-methyl-17(20)-[cis] - allopregnen - 3 - one with the appropriate acylating agent, e.g., the anhydride or acid halide of the selected acid in a solvent such as benzene, toluene, acetic acid, or the like, preferably in the presence of pyridine or a similar amine.

EXAMPLE 7

The 3-ethylene glycol ketal of 5α,11β,17α,21-tetrahydroxy - 6β - fluoro-16α-methylallopregnane-3,20-dione 21-acetate To a solution of 0.93 gram of the 3-ethylene glycol ketal of 5α,11β-dihydroxy-6β-fluoro-16α-methyl - 17(20)- allopregnen-3-one 21-acetate in 35 milliliters of tertiary butyl alcohol was added one milliliter of pyridine, 2.75 milliliters of two molar N-methylmorpholine oxide peroxide (U.S. 2,769,823) in tertiary butyl alcohol, and 13.1 milligrams of osmium tetroxide in tertiary butyl alcohol (9.1 milliliters of tertiary butyl alcohol solution containing 1.44 milligrams osmium tetroxide per milliliter). The solution was stirred for a period of eighteen hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. The residue was crystallized from acetone-Skellysolve B hexanes to give the 3-ethylene glycol ketal of $5\alpha,11\beta,17\alpha,21$-tetrahydroxy-$6\beta$-fluoro - $16\alpha$ - methylallopregnane-3,20-dione 21-acetate.

EXAMPLE 8

$6\alpha$-fluoro-$11\beta,17\alpha,21$-trihydroxy-$16\alpha$-methyl-4-pregnene-3,20-dione 21-acetate A solution of 0.144 gram of the 3-ethylene glycol ketal of $5\alpha,11\beta,17\alpha,21$-tetrahydroxy-$6\beta$-fluoro-$16\alpha$ - methylallopregnane-320-dione 21-acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less to give $6\alpha$-fluoro-$11\beta,17\alpha,21$-trihydroxy-$16\alpha$-methyl-4-pregnene-3,20-dione 21-acetate.

EXAMPLE 9

$6\alpha$-fluoro-$11\beta,17\alpha,21$-trihydroxy-$16\alpha$-methyl-1,4-prednadiene-3,20-dione A medium consisting of one percent dextrose hydrate, two percent cornsteep liquor of sixty percent solids and tap water was adjusted to pH 4.9 with sodium hydroxide. The medium was steam sterilized at fifteen pounds pressure for thirty minutes, cooled, and then inoculated with a 24-hour growth, from spores, of Septomyxa affinis, A.T.C.C. 6737. The medium was agitated, and sparged with sterile air at the rate of one-tenth volume of air per volume of medium per minute. At the end of 24 hours of fermentation at room temperature, the pH was about 7.4. To this culture there was added a solution of $6\alpha$-fluoro-$11\beta,17\alpha,21$-trihydroxy-$16\alpha$ - methyl - 4-pregnene-3,20-dione 21-acetate dissolved in a minimal amount of diethylformamide. The solution was prepared by dissolving five parts of the steroid in 100 parts of the solvent and adding about ten cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give $6\alpha$-fluoro-$11\beta,17\alpha,21$-trihydroxy-$16\alpha$ - methyl - 1,4-pregnadiene-3,20-dione.

Following the procedure of Example 9, but substituting as starting material $6\alpha$-fluoro-$11\beta,17\alpha,21$-trihydroxy-$16\alpha$-methyl-4-pregnene-3,20-dione 21-acetate there was likewise produced $6\alpha$-fluoro - $11\beta,17\alpha,21$ - trihydroxy - $16\alpha$-methyl-1,4-pregnadiene-3,20-dione.

EXAMPLE 10

$6\alpha$-fluoro-$11\beta,17\alpha,21$-trihydroxy-$16\alpha$-methyl-4-pregnene-3,20-dione A solution of 1.1 grams of $6\alpha$-fluoro-$11\beta,17\alpha,21$-trihydroxy-$16\alpha$-methyl-4-pregnene-3,20-dione 21-acetate, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene chloride, and the extract was dried over sodium sulfate to give a solution of $6\alpha$-fluoro-$11\beta,17\alpha,21$-trihydroxy-$16\alpha$-methyl-4-pregnene-3,20-dione which was freed of solvent by evaporation.

EXAMPLE 11

$6\alpha$-fluoro-$11\beta,17\alpha,21$-trihydroxy-$16\alpha$-methyl-1,4-pregnadiene-3,20-dione 21-acetate 1.5 grams of $6\alpha$ - fluoro-$11\beta,17\alpha,21$-trihydroxy - $16\alpha$-methyl-1,4-pregnadiene-3,20-dione was dissolved in twenty milliliters of pyridine and fifteen milliliters of acetic anhydride and the mixture heated at forty degrees centigrade for four hours. The solution was cooled and then slowly diluted with water. The precipitated steroid was removed by filtration, washed with water and dried to give $6\alpha$-fluoro-$11\beta,17\alpha,21$-trihydroxy-$16\alpha$-methyl-1,4-pregnadiene - 3,20-dione 21-acetate.

$6\alpha$-fluoro-$11\beta,17\alpha,21$-trihydroxy - $16\alpha$ - methyl - 1,4-pregnadiene-3,20-dione is converted to other 21-esters by reaction with the appropriate acid anhydride, acid chloride or bromide or by other methods known in the art, e.g., by ester exchange, acid in the presence of an esterification catalyst, etc., to produce $6\alpha$-fluoro-$11\beta,17\alpha,21$-trihydroxy-$16\alpha$-methyl-1,4-pregnadiene-3,20 - dione 21-acylates which include those wherein the acyl radical of the 21-acylate group is the acyl radical of, for example, a lower aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, $\alpha$-ethylisovaleric, a cyclic acid, e.g., cyclopropylideneacetic, a cycloaliphatic acid, e.g., cyclopentylformic, cyclopentylacetic, $\beta$-cyclopentylpropionic, cyclohexylformic, cyclohexylacetic, $\beta$-cyclohexylpropionic, an aryl or alkaryl acid, e.g., benzoic 2-, 3-, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, $\alpha$-naphthoic, 3-methyl-$\alpha$-naphthoic, an aralkyl acid, e.g., phenylacetic, phenylpropionic, diphenylacetic, triphenylacetic, a dibasic acid (which can be converted to water soluble, e.g., sodium salts), e.g., succinic, glutaric, $\alpha$-methylglutaric, $\beta$-methylglutaric, $\beta,\beta$-dimethylglutaric, adipic, pimelic, suberic, a hydroxy acid, e.g., glycolic, lactic, citric, tartaric, d-malic, d-glyceric, mannonic, gluconic, salicylic, 2,3,4-trimethoxybenzoic, $\alpha$-naphthoxyacetic, or other acyl acid.

Similarly, $6\alpha$-fluoro-$11\beta,17\alpha,21$-trihydroxy-$16\alpha$-methyl-4-pregnene-3,20-dione is converted to any of the other esters named in the paragraph following Example 11 by substituting $11\beta,17\alpha,21$-trihydroxy-$16\alpha$-methyl - 4 - pregnene-3,20-dione as the starting compound in the acylation reaction.

EXAMPLE 12

$6\alpha$-fluoro-$16\alpha$-methyl-$17\alpha,21$-dihydroxy-1,4-pregnadiene-3,11,20-trione 21-acetate To a solution of 2.5 millimoles of $6\alpha$-fluoro-$11\beta,17\alpha,21$-trihydroxy - $16\alpha$-methyl-1,4-pregnadiene - 3,20 - dione 21-acetate and two milliliters of pyridine in 75 milliliters of tertiary butanol was added 500 milligrams of N-bromoacetamide. The reaction mixture was maintained at room temperature for about sixteen hours whereupon the solution was diluted with fifty milliliters of water containing 500 milligrams of sodium sulfite, and the mixture was then concentrated at reduced pressure to about forty milliliters. The distillation residue was refrigerated, filtered, and the filter cake was washed with water and then dried. It consisted of 6α-fluoro-16α-methyl-17α,21-dihydroxy-1,4-pregnadiene-3,11,20-trione 21-acetate.

EXAMPLE 13

6α-fluoro-16α-methyl-17α,21-dihydroxy-4-pregnene-3,11,20-trione 21-acetate

Following the procedure of Example 12, but substituting 6α-fluoro-11β,17α,21-trihydroxy-16α-methyl - 4 - pregnene-3,20-dione 21-acetate as starting compound, there is thus produced 6α-fluoro-16α-methyl-17α,21-dihydroxy-4-pregnene-3,11,20-trione 21-acetate.

Similarly, substituting another 21-acylate of 6α-fluoro-11β,17α,21-trihydroxy-16α-methyl-1,4-pregnadiene - 3,20-dione or 21-acylate of 6α-fluoro-11β,17α,21-trihydroxy-16α-methyl-4-pregnene-3,20-dione wherein the acyl radical is, e.g., that of an acid named in the paragraph following Example 11, as the starting compound in the oxidation reaction described in Example 12, there is thus produced the corresponding 21-acylate of 6α-fluoro-16α-methyl-17α,21-dihydroxy-1,4-pregnadiene-3,11,20 - trione and of 6α-fluoro-16α-methyl-17α,21-dihydroxy - 4 - pregnene-3,11,20-trione, respectively.

EXAMPLE 14

6α-fluoro-16α-methyl-17α,21-dihydroxy-1,4,9(11)-pregnatriene-3,20-dione 21-acetate To a solution of 8.5 grams of 6α-fluoro-11β,17α,21-trihydroxy - 16α - methyl-1,4-pregnadiene-3,20-dione 21-acetate in 42.5 milliliters of pyridine was added 5.63 grams of N-bromoacetamide. After standing at room temperature for a period of fifteen minutes, the reaction solution was cooled to five to ten degrees centigrade and sulfur dioxide gas was passed over the surface of the solution while shaking the flask until the solution gave no color with acidified starch-iodide paper. During the addition of the sulfur dioxide, the reaction mixture became warm. The temperature was kept under thirty degrees centigrade by external cooling and by varying the rate of sulfur dioxide addition. Thereafter to the reaction mixture was added 400 milliliters of ice water and the resulting precipitate collected by filtration. This material was recrystalized from acetone-Skellysolve B hexanes to give 6α-fluoro-16α - methyl - 17α,21-dihydroxy-1,4,9(11)-pregnatriene-3,20-dione 21-acetate.

EXAMPLE 15

6α-fluoro-16α-methyl-17α,21-dihydroxy-4,9(11)-pregnadiene-3,20-dione 21-acetate

Following the procedure of Example 14, but substituting 6α - fluoro-11β,17α,21-trihydroxy-16α-methyl-4-pregnene-3,20-dione 21-acetate as the starting compound, there is thus produced 6α-fluoro-16α-methyl-17α,21-dihydroxy-4,9(11)-pregnadiene-3,20-dione 21-acetate.

Similarly, substituting another 21-acylate of 6α-fluoro-11β,17α,21 - trihydroxy - 16α-methyl - 1,4-pregnadiene-3,20-dione or a 21-acylate of 6α-fluoro-11β,17α,21-trihydroxy-16α-methyl-4-pregnene-3,20-dione wherein the acyl radical is, e.g., that of an acid named in the paragraph following Example 11, as the starting compound in the dehydration reaction described in Example 11, there is thus produced the corresponding 21-acylate of 6α-fluoro-16α - methyl - 17α,21-dihydroxy-1,4,9(11)-pregnatriene-3,20-dione and of 6α-fluoro-16α-methyl-17α,21-dihydroxy-4,9(11)-pregnadiene-3,20-dione, respectively.

EXAMPLE 16

6α-fluoro-9α-bromo-11β,17α,21-trihydroxy-16α-methyl-1,4-pregnadiene-3,20-dione 21-acetate To a solution of 5.68 grams of 6α-fluoro-16α-methyl-17α,21 - dihydroxy-1,4,9(11)-pregnatriene-3,20-dione 21-acetate in 100 milliliters of methylene chloride and 250 mililiters of tertiary butyl alcohol was added a solution of fourteen milliliters of 72 percent perchloric acid in 100 milliliters of water followed by a solution of 2.34 grams of N-bromoacetamide in sixty milliliters of tertiary butyl alcohol. After stirring the reaction mixture for fifteen minutes, a solution of 2.8 grams of sodium sulfite in 140 milliliters of water was added and the reaction mixture was concentrated to a volume of about 500 milliliters under reduced pressure at about fifty degrees centigrade. The concentrate was cooled in an ice bath and while stirring 500 milliliters of water was added. After stirring for a period of one hour, the precipitated product was isolated by filtration, and the cake washed with water and air-dried to give 6α - fluoro-9α-bromo-11β,17α,21-trihydroxy-16α-methyl-1,4-pregnadiene-3,20-dione 21-acetate.

EXAMPLE 17

6α-fluoro-9α-bromo-11β,17α,21-trihydroxy-16α-methyl-4-pregnene-3,20-dione 21-acetate Following the procedure of Example 16, but substituting 6α-fluoro-16α-methyl-17α,21-dihydroxy-4,9(11)-pregnadiene-3,20-dione 21-acetate as the starting compound, there is thus produced 6α-fluoro-9α-bromo-11β,17α,21-trihydroxy-16α-methyl-4-pregnene-3,20-dione 21-acetate.

Similarly, substituting another 21-acylate of 6α-fluoro-16α - methyl - 17α,21-dihydroxy-1,4,9(11)-pregnatriene-3,20-dione or a 21-acylate of 6α-fluoro-17α,21-dihydroxy-16α-methyl-4,9(11)-pregnadiene-3,20-dione wherein the acyl radical is, e.g., that of an acid named in the paragraph following Example 11, as the starting compound in the reaction described in Example 16, there is thus produced the corresponding 21-acylate of 6α-fluoro-9α-bromo-11β,17α21 - trihydroxy-16α-methyl-1,4-pregnadiene-3,20-dione and of 6α-fluoro-9α-bromo-11β,17α,21-trihydroxy-16α-methyl-4-pregnene-3,20-dione, respectively.

Substituting N-chlorosuccinimide for the N-bromoacetamide in the reactions described in Examples 16, 17 and the paragraph following is productive of the corresponding 9α - chloro compounds, e.g., 6α - fluoro - 9α - chloro-11β,17α,21 - trihydroxy-16α-methyl-1,4-pregnadiene-3,20-dione 21-acetate and 6α-fluoro-9α-chloro-11β,17α,21-trihydroxy-16α-methyl-4-pregnene-3,20-dione 21-acetate.

EXAMPLE 18

6α-fluoro-9β,11β-epoxy-17α,21-dihydroxy-16α-methyl-1,4-pregnadiene-3,20-dione 21-acetate To a solution of 6.78 grams of 6α-fluoro-9α-bromo-11β,17α,21 - trihydroxy-16α-methyl-1,4-pregnadiene-3,20-dione 21-acetate in 175 milliliters of acetone was added 6.78 grams of potassium acetate and the resulting suspension was heated under reflux for a period of seventeen hours. The mixture was then concentrated to approximately sixty milliliters volume at reduced pressure on the steam bath, diluted with water and extracted with methylene chloride. The methylene chloride extracts were combined, washed with water, dried over anhydrous sodium sulfate and evaporated. The residue was redissolved in methylene chloride and chromatographed over 500 grams of Florisil anhydrous magnesium silicate. The column was eluted with one-liter portions of hexanes (Skellysolve B) containing increasing proportions of acetone. There was thus eluted 6α - fluoro-9β,11β-epoxy-16α-methyl-17α,21-dihydroxy-1,4-pregnadiene-3,20-dione 21-acetate which was freed of solvent by evaporation of the eluates.

EXAMPLE 19

*6α-fluoro-9β,11β-epoxy-16α-methyl-17α,21-dihydroxy-4-pregnene-3,20-dione 21-acetate*

Following the procedure of Example 18, but substituting 6α-fluoro-9α-bromo-11β,17α,21-trihydroxy-16α - methyl-4-pregnene-3,20-dione 21-acetate as the starting compound, there is thus produced 6α-fluoro-9β,11β-epoxy,16α-methyl-17α,21-dihydroxy-4-pregnene-3,20-dione 21-acetate.

Similarly, substituting another 21-acylate of 6α-fluoro-9α-bromo-11β,17α,21-trihydroxy-16α-methyl-1,4 - pregnadiene-3,20-dione or a 21-acylate of 6α-fluoro-9α-bromo-11β,17α,21-trihydroxy-16α-methyl-4-pregnene-3,20 - dione wherein the acyl radical is, e.g., that of an acid named in the paragraph following Example 11, as the starting compound in the reaction described in Example 18, there is thus produced the corresponding 21-acylate of 6α-fluoro-9β,11β-epoxy-16α-methyl-17α,21-dihydroxy-1,4 - pregnadiene-3,20-dione and of 6α-fluoro-9β,11β-epoxy-16α-methyl-17α,21-dihydroxy-4-pregnene-3,20-dione, respectively.

EXAMPLE 20

*6α,9α-difluoro-11β,17α,21-trihydroxy-16α-methyl-1,4-pregnadiene-3,20-dione 21-acetate*

To approximately 1.3 grams of hydrogen fluoride contained in a polyethylene bottle and maintained at minus sixty degrees centigrade was added 2.3 milliliters of tetrahydrofuran and then a solution of 500 milligrams (0.0012 mole) of 6α-fluoro-9β,11β-epoxy-16α-methyl-17α,21-dihydroxy-1,4-pregnadiene-3,20-dione 21-acetate in two milliliters of methylene chloride. The steroid solution was rinsed in with an additional one milliliter of methylene chloride. The light red colored solution was then kept at approximately minus thirty degrees centigrade for one hour and at minus ten degrees for two hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 milliliters. The solution was chromatographed over 130 grams of Florisil anhydrous magnesium silicate. The column was developed with 260-milliliter portions of hexanes (Skellysolve B) containing increasing proportions of acetone. There was thus eluted 6α,9α-difluoro-11β,17α,21-trihydroxy-16α-methyl - 1,4 - pregnadiene-3,20-dione 21-acetate which was freed of solvent by evaporation of the eluate fractions.

EXAMPLE 21

*6α,9α-difluoro-11β,17α,21-trihydroxy-16α-methyl-4-pregnene-3,20-dione 21-acetate*

Following the procedure of Example 20, but substituting 6α-fluoro-9β,11β-epoxy-16α-methyl-17α,21 - dihydroxy-4-pregnene-3,20-dione 21-acetate as the starting compound, there is thus produced 6α,9α-difluoro-11β,17α,21-trihydroxy-16α-methyl-4-pregnene-3,20-dione 21-acetate.

Similarly, substituting another 21-acylate of 6α-fluoro-9β,11β-epoxy-17α,21-dihydroxy-16α-methyl-1,4 - pregnadiene-3,20-dione or a 21-acylate of 6α-fluoro-9β,11β-epoxy-17α,21-dihydroxy-16α - methyl-4-pregnene - 3,20 - dione wherein the acyl radical is, e.g., that of an acid named in the paragraph following Example 11, as the starting compound in the reaction described in Example 17, there is thus produced the corresponding 21-acylate of 6α,9α-difluoro-11β,17α,21-trihydroxy-16α-methyl-1,4 - pregnadiene-3,20-dione and of 6α,9α-difluoro-11β,17α,21-trihydroxy-16α-methyl-4-pregnene-3,20-dione, respectively.

EXAMPLE 22

*6α,9α-difluoro-16α-methyl-17α,21-dihydroxy-1,4-pregnadiene-3,11,20-trione 21-acetate*

A solution was prepared containing one milliliter of acetic acid, fifty milligrams of 6α,9α-difluoro-11β,17α,21-trihydroxy-16α-methyl-1,4-pregnadiene-3,20-dione 21-acetate, twenty milligrams of chromic anhydride and one drop (approximately fifty milligrams) of water. This mixture was shaken several times at room temperature and allowed to stand for four hours. Thereafter it was poured into ten milliliters of water and refrigerated for twenty hours at about five degree centigrade. The steroid which separated from the aqueous mixture was collected on filter paper and dried to give 6α,9α-difluoro-16α-methyl-17α,21-dihydroxy-1,4-pregnadiene-3,11,20-trione 21-acetate.

EXAMPLE 23

*6α,9α-difluoro-16α-methyl-17α,21-dihydroxy-4-pregnene-3,11,20-trione 21-acetate*

Following the procedure of Example 22, but substituting 6α,9α-difluoro-11β,17α,21-trihydroxy-16α-methyl-4 - pregnene-3,20-dione 21-acetate as the starting compound, there is thus produced 6α,9α-difluoro-16α-methyl-17α,21-dihydroxy-4-pregnene-3,11,20-trione 21-acetate.

Similarly, substituting another 21-acylate of 6α,9α-difluoro-11β,17α,21-trihydroxy-16α-methyl - 1,4 - pregnadiene-3,20-dione or a 21-acylate of 6α,9α-difluoro-11β,17α,21-trihydroxy-16α-methyl-4-pregnene-3,20-dione wherein the acyl radical is, e.g., that of an acid named in the paragraph following Example 11, as the starting compound in the oxidation reaction described in Example 22, there is thus produced the corresponding 21-acylate of 6α,9α-difluoro-16α-methyl-17α,21-dihydroxy-1,4 - pregnadiene - 3,11,20-trione and of 6α,9α-difluoro-16α-methyl-17α,21-dihydroxy-4-pregnene-3,11,20-trione, respectively.

EXAMPLE 24

*6α,9α-difluoro-11β,17α,21-trihydroxy-16α-methyl-1,4-pregnadiene-3,20-dione*

Three and one-quarter (3.25) grams of 6α,9α-difluoro-11β,17α,21 - trihydroxy - 16α - methyl - 1,4 - pregnadiene-3,20-dione 21-acetate was dissolved in 325 milliliters of methanol, previously purged of air-oxygen by passing nitrogen through it for ten minutes and thereto was added a solution of 1.63 grams of potassium bicarbonate in thirty milliliters of water, similarly purged of oxygen. The mixture was allowed to stand at room temperature for a period of five hours in a nitrogen atmosphere, thereupon neutralized with 2.14 milliliters of acetic acid in forty milliliters of water. The mixture was concentrated to approximately one-third volume at reduced pressure on a sixty-degree-centigrade water-bath. Thereupon 250 milliliters of water was added and the mixture chilled. The crystalline product was collected on a filter, washed with water and dried to give 6α,9α-difluoro-11β,17α,21-trihydroxy-16α-methyl-1,4-pregnadiene-3,20-dione.

EXAMPLE 25

*6α,9α-difluoro-11β,17α,21-trihydroxy-16α-methyl-4-pregnene-3,20-dione*

Following the procedure of Example 24, but substituting 6α,9α - difluoro - 11β,17α,21 - trihydroxy-16α-methyl-4-pregnene-3,20-dione 21-acetate as the starting compound, there is thus produced 6α,9α-difluoro-11β,17α,21-trihydroxy-16α-methyl-4-pregnene-3,20-dione.

Similarly, 6α,9α-difluoro-16α-methyl-17α,21-dihydroxy-4-pregnene-3,11,20-trione 21-acetate is hydrolyzed to 6α,9α - difluoro - 16α - methyl-17α,21-dihydroxy-4-pregnene-3,11,20-trione and 6α,9α - difluoro - 16α - methyl - 17α,21 - dihydroxy-1,4-pregnadiene-3,11,20-trione 21-acetate is hydrolyzed to 6α,9α-difluoro-16α-methyl-17α,21-dihydroxy-1,4 - pregnadiene - 3,11,20 - trione. The corresponding 9α-chloro compouds are similarly prepared by hydrolysis of their 21-acetates, e.g., 6α-fluoro - 9α - chloro - 11β,17α,21 - trihydroxy-16α - methyl - 1,4 - pregnadiene - 3,20 - dione and 6α-fluoro - 9α - chloro - 11β,17α,21 - trihydroxy - 16α - methyl-4-pregnene-3,20-dione are prepared from 6α-fluoro-9α - chloro - 11β,17α,21 - trihydroxy - 16α - methyl - 1,4 - pregnadiene-3,20-dione 21-acetate and from 6α-fluoro-9α-chloro - 11β,17α,21 - trihydroxy - 16α - methyl - 4 - pregnene-3,20-dione 21-acetate, respectively.

EXAMPLE 26

*6α,9α-difluoro-11β,17α,21-trihydroxy-16α-methyl-1,4-pregnadiene-3,20-dione 21-propionate*

A solution was prepared containing fifty milligrams of 6α,9α - difluoro-11β,17α,21 - trihydroxy - 16α - methyl - 1,4-pregnadiene-3,20-dione in one milliliter of pyridine and one milliliter of propionic anhydride. The solution was allowed to stand at room temperature for a period of 21 hours and was thereupon poured into ten milliliters of water. The reaction mixture was then extracted with three ten-milliliter portions of methylene chloride, the methylene chloride extracts were combined, washed with water, dried over anhydrous sodium sulfate and evaporated to give a residue of 6α,9α - difluoro - 11β,17α,21 - trihydroxy - 16α - methyl-1,4-pregnadiene-3,20-dione 21-propionate.

EXAMPLE 27

*6α,9α-difluoro-11β,17α,21-trihydroxy-16α-methyl-4-pregnene-3,20-dione 21-propionate*

Following the procedure of Example 26, but substituting 6α,9α - difluoro - 11β,17α,21 - trihydroxy - 16α - methyl - 4-pregnene-3,20-dione as starting compound, there is thus produced 6α,9α - difluoro - 11β,17α,21 - trihydroxy - 16α - methyl-4-pregnene-3,20-dione 21-propionate.

Similarly, 6α,9α-difluoro-16α-methyl-17α,21-dihydroxy-1,4-pregnadiene-3,11,20-trione is converted to 6α,9α-difluoro - 16α - methyl - 17α,21 - dihydroxy - 1,4 - pregnadiene - 3,11,20 - trione 21 - propionate and 6α,9α - difluoro - 16α - methyl - 17α,21 - dihydroxy - 4 - pregnene - 3,11,20-trione is converted to 6α,9α-difluoro-16α-methyl-17,21-dihydroxy-4-pregnene-3,11,20-trione 21-propionate.

Similarly, substituting another acylating agent for the propionic anhydride in the esterification of 6α,9α-difluoro-11β,17α,21 - trihydroxy - 16α - methyl - 1,4 - pregnadiene-3,20 - dione or 6α,9α-difluoro-11β,17α,21-trihydroxy-16α-methyl - 4 - pregnene - 3,20-dione, e.g., in the manner described in the paragraph following Example 11, there is thus produced other 21-acylates of 6α,9α-difluoro-11β,17α, 21 - trihydroxy - 16α - methyl-1,4-pregnadiene-3,20-dione and of 6α,9α-difluoro-11β,17α,21-trihydroxy-16α-methyl-4-pregnene-3,20-dione, respectively, wherein the acyl radical is, e.g., that of an acid named in the paragraph following Example 6. The corresponding 11-keto compounds are similarly converted to their corresponding 21-acylate esters.

EXAMPLE 28

*6α-fluoro-11β,17α,21-trihydroxy-16α-methyl-1,4-pregnadiene-3,20-dione 21-methanesulfonate*

A solution was prepared containing one gram (2.6 millimoles) of 6α - fluoro - 11β,17α,21-trihydroxy-16α-methyl-1,4-pregnadiene-3,20-dione in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until the aqueous layer had a pH of two to three, then washed again with cold sodium bicarbonate solution, water and finally dried over anhydrous sodium sulfate. Evaporation of the methylene chloride extract at reduced pressure left a residue of 6α-fluoro-11β,17α,21 - trihydroxy - 16α - methyl-1,4-pregnadiene-3,20-dione 21-methanesulfonate.

Similarly, substituting 6α-fluoro-11β,17α-21-trihydroxy-16α-methyl-4-pregnene-3,20-dione as the starting compound, there is thus produced 6α-fluoro-11β,17α,21-trihydroxy-16α-methyl-4-pregnene-3,20-dione 21 - methanesulfonate. The corresponding 9α-fluoro and 9α-chloro 21-methanesulfonate compounds are similarly prepared.

EXAMPLE 29

*6α-fluoro-11β,17α-dihydroxy-16α-methyl-21-iodo-1,4-pregnadiene-3,20-dione*

The crude 6α-fluoro-11β,17α-21-trihydroxy-16α-methyl-1,4-pregnadiene-3,20-dione 21-methanesulfonate described in Example 28 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one-third volume at reduced pressure. Ice and water were added and the precipitated product collected on a filter, washed with water and dried to yield 6α-fluoro-11β,17α-dihydroxy-16α-methyl-21-iodo - 1,4 - pregnadiene-3,20-dione.

Similarly, substituting 6α-fluoro-11β,17α,21-trihydroxy-16α-methyl-4-pregnene - 3,20 - dione 21-methanesulfonate as the starting compound, there is thus produced 6α-fluoro-11β,17α-dihydroxy-16α-methyl - 21 - iodo-4-pregnene-3,20-dione. The 9α-chloro and 9α-fluoro analogues of both of these compounds are similarly prepared.

EXAMPLE 30

*6α,21-difluoro-11β,17α-dihydroxy-16α-methyl-1,4-pregnadiene-3,20-dione*

One gram of 6α-fluoro-11β,17α-dihydroxy-16α-methyl-21-iodo-1,4-pregnadiene-3,20-dione was dissolved in 150 milliliters of boiling acetonitrile. After cooling to forty degrees centigrade, the solution was protected from light and 0.8 milliliter of a fifty percent aqueous solution of silver fluoride was added under stirring. Stirring was continued for one hour at about forty degrees centigrade, then 0.7 milliliter of silver fluoride solution was added. After another hour of stirring another 0.7 milliliter portion of aqueous silver fluoride solution was added. Heating and stirring was then continued for a period of two hours. The brown mixture was then filtered through a bed of diatomaceous earth (Celite) and the filtrate evaporated at reduced pressure at a bath temperature of fifty degrees centigrade. The brown residue was thoroughly extracted with two 100-milliliter portions of warm methylene chloride, the combined extracts washed with water and dried over anhydrous sodium sulfate. The dried solution was concentrated to approximately 100 milliliters and then chromatographed over fity grams of magnesium silicate (Florisil). The column was eluted with hexanes containing increasing proportions of acetone to give 6α, 21-difluoro-11β,17α-dihydroxy-16α-methyl - 1,4 - pregnadiene-3,20-dione.

In the same manner as given in Examples 28 to 30, 6α,9α-difluoro-11β,17α,21-trihydroxy - 16α - methyl-1,4-pregnadiene-3,20-dione was converted to 6α,9α, 21-trifluoro-11β,16α-dihydroxy-16α-methyl - 1,4 - pregnadiene-3,20-dione.

Similarly, substituting 6α-fluoro-11β,17α-dihydroxy-16α-methyl-21-iodo-4-pregnene-3,20-dione starting compound, there is thus produced 6α,21-difluoro-11β,17α-dihydroxy-16α-methyl-4-pregnene-3,20-dione. 6α,9α,21 - trifluoro-11β,17α-dihydroxy-16α-methyl - 4 - pregnene-3,20-dione is similarly prepared from 6α,9α-difluoro-11β,17α-dihydroxy-16α-methyl-21-iodo-4-pregnene-3,20-dione. The corresponding 9α-chloro compounds are similarly prepared.

EXAMPLE 31

*6α,21-difluoro-11β,17α-dihydroxy-16α-methyl-1,4-pregnadiene-3,20-dione*

A solution of one gram of 6α-fluoro-11β,17α,21-trihydroxy-16α-methyl - 1,4 - pregnadiene - 3,20 - dione-21-methanesulfonate and 0.50 gram of anhydrous potassium fluoride in ten milliliters of dimethylsulfoxide was heated at 100 degrees centigrade for twelve hours. The cooled solution was diluted with water and then extracted with methylene chloride. The extracts were dried and chromatographed over magnesium silicate in the manner described in Example 30 to give substantially pure 6α,21-difluoro - 11β,17α - dihydroxy-16α-methyl - 1,4 - pregnadiene-3,20-dione.

EXAMPLE 32

*6α,21-difluoro-16α-methyl-17α-hydroxy-1,4-pregnadiene-3,11,20-trione*

A solution was prepared containing 0.5 gram of 6α,21-difluoro-11β,17α-dihydroxy-16α-methyl - 1,4 - pregnadiene-3,20-dione, 0.15 gram of chromic acid, ten milliliters of glacial acetic acid and one-half milliliter of water. This mixture was stirred and then maintained for eight hours at room temperature. Thereafter the mixture was poured into fifty millilites of ice water, neutralized by the addition of dilute sodium hydroxide and the thus-obtained precipitate collected on a filter and recrystallized three times from a mixture of ethyl acetate and Skellysolve B hexanes to give 6α,21-difluoro-16α-methyl-17α-hydroxy-1,4-pregnadiene-3,11,20-trione.

In the same manner given in Example 32, 6α,9α,21-trifluoro - 11β,17α - dihydroxy-16α-methyl-1,4-pregnadiene-3,20-dione was oxidized to 6α,9α,21-trifluoro-16α-methyl-17α-hydroxy-1,4-pregnadiene-3,11,20-trione.

Similarly, 6α,21-difluoro - 16α - methyl-17α-hydroxy-4-pregnene-3,11,20-trione is prepared from 6α,21-difluoro-11β,17α-dihydroxy-16α-methyl-4-pregnene-3,20-dione and 6α,9α,21-trifluoro - 16α - methyl-17α-hydroxy-4-pregnene-3,11,20-trione is prepared from 6α,9α,21-trifluoro-11β,17α-dihydroxy-16α-methyl-4-pregnene-3,20-dione. The corresponding 9α-chloro compounds are similarly prepared.

Example 33

*6α-fluoro-11β,17α-dihydroxy-16α-methyl-1,4-pregnadiene-3,20-dione*

150 milligrams of 6α-fluoro-11β,17α-dihydroxy-16α-methyl-21-iodo-1,4-pregnadiene - 3,20-dione was slurried with five milliters of acetic acid and stirred for a period of 45 minutes. Then an aqueous solution of 250 milligrams of sodium thiosulfate pentahydrate was added causing the iodine color to disappear. Additional water was added (fifty milliliters) and the mixture extracted with three 25-milliliter portions of methylene chloride. The methylene chloride extracts were combined, washed with water and cold sodium bicarbonate solution until all acetic acid was neutralized. After drying over anhydrous sodium sulfate, the solution was concentrated to approximately fifteen milliters and chromatographed over ten grams of magnesium silicate (Florisil). The column was developed with hexanes containing increasing proportions of acetone, to give substantially pure 6α-fluoro-11β,17α-dihydroxy-16α-methyl-1,4-pregnadiene-3,20-dione.

Following the procedure of Example 33, 6α,9α-difluoro-11β,17α-dihydroxy-16α-methyl-21-iodo-1,4 - pregnadiene-3,20-dione was converted to 6α,9α-difluoro-11β,17α-dihydroxy-16α-methyl-1,4-pregnadiene-3,20-dione.

Similarly, 6α-fluoro-11β,17α-dihydroxy-16α - methyl-4-pregnene-3,20-dione is prepared from 6α-fluoro-11β,17α-dihydroxy-16α-methyl-21-iodo-4-pregnene-3,20-dione and 6α,9α-difluoro-11β,17α - dihydroxy - 16α - methyl - 4-pregnene-3,20-dione from 6α,9α-difluoro-11β,17α-dihydroxy-16α-methyl-21-iodo-4-pregnene-3,20 - dione. The corresponding 9α-chloro compounds are similarly prepared.

Example 34

*6α-fluoro-16α-methyl-17α-hydroxy-1,4-pregnadiene-3,11,20-trione*

A mixture was prepared containing 0.3 gram of 6α-fluoro-11β,17α-dihydroxy-16α-methyl - 1,4 - pregnadiene-3,20-dione, 100 milligrams of chromic anhydride, ten milliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus-obtained precipitate collected on a filter and dried to give 6α-fluoro-16α-methyl-17α-hydroxy-1,4-pregnadiene - 3,11.20-trione.

Following the procedure of Example 34, 6α,9α-difluoro-11β,17α-dihydroxy-16α-methyl-1,4 - pregnadiene - 3,20-dione was oxidized to 6α,9α-difluoro-16α-methyl - 17α-hydroxy-1,4-pregnadiene-3,11,20-trione.

Similarly, 6α-fluoro-16α-methyl-17α - hydroxy-4-pregnene-3,11,20-trione is prepared from 6α-fluoro-11β,17α-dihydroxy-16α-methyl-4-pregnene-3,20-dione and 6α,9α-difluoro-16α-methyl-17α-hydroxy-4-pregnene - 3,11,20 - trione is prepared from 6α,9α-difluoro-11β,17α-dihydroxy-16α-methyl-4-pregnene-3,20-dione. The corresponding 9α-chloro compounds are similarly prepared.

Examples showing the preparation of the 16β-methyl compounds of the invention:

Example 1A

*The 3-ethylene glycol ketal of 3,11-diketo-16β-methyl-4,-17(20)-[cis]-pregnadien-21-oic acid methyl ester*

To a solution of 1.5 grams of 3,11-diketo-16β-methyl-4,17(20)-[cis]-pregnadien-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The water formed in the reaction was removed by passing the condensate through a water trap. The cooled reaction mixture was washed with 100 milliliters of a one percent aqueous sodium bicarbonate solution. The benezene layer was then poured on a column of 150 grams of magnesium silicate (Florisil). The column was developed with 100-milliliter portions of solvent of the following composition and order: eight portions of methylene chloride plus four percent acetone and three portions of methylene chloride plus eight percent acetone. The methylene chloride plus four percent acetone eluates contained the 3-ethylene glycol ketal of 3,11-diketo-16β-methyl-4,17(20)-[cis]-pregnadien-21-oic acid methyl ester which was freed of solvent by evaporation.

Reacting 3,11-diketo - 16β-methyl-4,17(20)-[cis]-pregnadien-21-oic acid methyl ester with trimethylene glycol in the presence of para-toluenesulfonic acid is productive of the 3-trimethylene glycol ketal of 3,11-diketo-16β-methyl-4,17(20)-[cis]-pregnadien - 21 - oic acid methyl ester.

Similarly, other 3-ketals of this and other esters of 3,11-diketo-16β-methyl-4,17(20) - [cis] - pregnadien-21-oic acid methyl ester are produced by the reaction of the selected ester of 3,11-diketo-16β-methyl-4,17(20)-[cis]-pregnadien-21-oic acid, e.g., methyl, ethyl, propyl, butyl, or octyl ester, with a glycol as hereinbefore described, e.g., ethylene glycol, propylene glycol, trimethylene glycol, lower-alkyl substituted ethylene glycols or trimethylene glycols, in the presence of an acid catalyst, e.g., para-toluenesulfonic acid, hydrogen chloride, sulfuric acid.

Example 2A

*3-ethylene glycol ketal of 3,11-diketo-5α,6α-epoxy-16β-methyl-17(20)-[cis]-allopregnen - 21 - oic acid methyl ester*

To a solution of five grams of the 3-ethylene glycol ketal of 3,11-diketo-16β-methyl-4,17(20)-[cis]-pregnadien-21-oic acid methyl ester in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of the 3-ethylene glycol ketal of 3,11-diketo-5α,6α-epoxy-16β-methyl-17(20)-[cis]-allopregnen-21-oic acid methyl ester.

EXAMPLE 3A

*3,11-diketo-5α-hydroxy-6β-fluoro-16β-methyl-17(20)-[cis]-allopregnen-21-oic acid methyl ester*

To a solution of 1.73 grams of 3-ethylene glycol ketal of 3,11-diketo-5α-6α-epoxy-16β-methyl-17(20)-[cis]-allopregnen-21-oic acid methyl ester in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography over magnesium silicate gave two fractions. The first was eluted with methylene chloride plus five percent acetone and the second was eluted with methylene chloride plus ten and twenty percent acetone. Crystallization of the first fraction from a mixture of acetone and Skellysolve B hexanes gave 3,11-diketo-5α-hydroxy-6β-fluoro-16β-methyl-17(20)-[cis]-allopregnen-21-oic acid methyl ester.

EXAMPLE 4A

*3-ethylene glycol ketal of 3,11-diketo-5α-hydroxy-6β-fluoro-16β-methyl-17(20)-[cis]-allopregnen-21-oic acid methyl ester*

A mixture of 1.9 grams of methyl 6β-fluoro-3,11-diketo-5α-hydroxy-16β-methyl-17(20)-[cis]-allopregnen-21-oate, 59 milligrams of para-toluenesulfonic acid monohydrate and 31 milliliters of distilled ethylene glycol was added to 800 milliliters of benzene. The mixture was stirred and refluxed for two hours, with the condensate passing through a water trap to remove the water. Then the mixture was cooled, washed with water and evaporated to dryness to give a crude solid which on recrystallization from a mixture of acetone and hexanes gave the 3-ethylene glycol ketal of 3,11-diketo-5α-hydroxy-6β-fluoro-16β-methyl-17(20)-[cis]-allopregnen-21-oic acid methyl ester.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of 3,11-diketo-5α-hydroxy-6β-methyl-17(20)-[cis]-allopregnen-21-oic acid methyl ester.

EXAMPLE 5A

*The 3-ethylene glycol ketal of 5α,11β,21-trihydroxy-6β-fluoro-16β-methyl-17(20)-[cis]-allopregnen-3-one*

To a solution of 1.96 grams of the 3-ethylene glycol ketal of 3,11-diketo-5α-hydroxy-6β-fluoro-16β-methyl-17(20)-[cis]-allopregnen-21-oic acid methyl ester in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give the 3-ethylene glycol ketal of 5α,11β,21-trihydroxy-6β-fluoro-16β-methyl-17(20)-[cis]-allopregnen-3-one.

EXAMPLE 6A

*The 3-ethylene glycol ketal of 5α,11β,21-trihydroxy-6β-fluoro-16β-methyl-17(20)-[cis]-allopregnen-3-one 21-acetate*

0.87 gram of the 3-ethylene ketal of 5α,11β,-21-trihydroxy-6β-fluoro-16β-methyl-17(20)-[cis]-allopregnen-3-one was dissolved in ten milliliters of acetic anhydride and ten milliliters of pyridine. The solution was maintained sixteen hours at room temperature and then poured into ice water to give the 3-ethylene glycol ketal of 5α,11β,21-trihydroxy-6β-fluoro-16β-methyl-17(20)-[cis]-allopregnen-3-one 21-acetate.

Similarly, other 21-organic carboxylic acid esters of 5α,11β-21-trihydroxy-6β-fluoro-16β-methyl-17(20)-[cis]-allopregnen-3-one 3-ethylene ketals can be prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting the 3-ethylene ketal of 5α,11β,21-trihydroxy-6β-fluoro-16β-methyl-17(20)-[cis]-allopregnen-3-one with the appropriate acylating agent, e.g., the anhydride or acid halide of the selected acid in a solvent such as benzene, toluene, acetic acid, or the like, preferable in the presence of pyridine or a similar amine.

EXAMPLE 7A

*The 3-ethylene glycol ketal of 5α,11β,17α,21-tetrahydroxy-6β-fluoro-16β-methylallopregnane-3,20-dione 21-acetate*

To a solution of 0.93 gram of the 3-ethylene glycol ketal of 5α,11β-dihydroxy-6β-fluoro-16β-methyl-17(20)-[cis]-allopregnen-3-one 21-acetate in 35 milliliters of tertiary butyl alcohol was added one milliliter of pyridine, 2.75 milliliters of two molar N-methylmorpholine oxide peroxide (U.S. 2,769,823) in tertiary butyl alcohol, and 13.1 milligrams of osmium tetroxide in tertiary butyl alcohol (9.9 milliliters of tertiary butyl alcohol solution containing 1.44 milligrams osmium tetroxide per milliliter). The solution was stirred for a period of eighteen hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. The residue was crystallized from acetone-Skellysolve B hexanes to give the 3-ethylene glycol ketal of 5α,11β,17α,21-tetrahydroxy-6β-fluoro-16β-methylallopregnane-3,20-dione 21-acetate.

EXAMPLE 8A

*6α-fluoro-11β,17α,21-trihydroxy-16β-methyl-4-pregnene-3,20-dione 21-acetate*

A solution of 0.144 gram of the 3-ethylene glycol ketal of 5α,11β,17α,21-tetrahydroxy-6β-fluoro-16β-methylallopregnane-3,20-dione 21-acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less to give 6α-fluoro-11β,17α,21-trihydroxy-16β-methyl-4-pregnene-3,20-dione 21-acetate.

EXAMPLE 9A

*6α-fluoro-11β,17α,21-trihydroxy-16β-methyl-1,4-pregnadiene-3,20-dione*

A medium consisting of one percent dextrose hydrate, two percent cornsteep liquor of sixty percent solids and tap water was adjusted to pH 4.9 with sodium hydroxide. The medium was steam sterilized at fifteen pounds pressure for thirty minutes, cooled, and then inoculated with a 24-hour growth, from spores, of *Septomyxa affinis*, A.T.C.C. 6737. The medum was agitated, and sparged with sterile air at the rate of one-tenth volume of air per volume of medium per minute. At the end of 24 hours of fermentation at room temperature, the pH was about 7.4. To this culture there was added a solution of 6α-fluoro - 11β,17α,21 - trihydroxy - 16β - methyl - 4 - pregnene-3,20-dione 21-acetate dissolved in a minimal amount of diethylformamide. The solution was prepared by dissolving five parts of the steroid in 100 parts of the solvent and adding about ten cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give 6α-fluoro-11β,17α - 21 - trihydroxy - 16β - methyl - 1,4 - pregnadiene-3,20-dione.

Following the procedure of Example 9A, but substituting as starting material 6α-fluoro-11β,17α,21-trihydroxy-16β-methyl-4-pregnene-3,20-dione there was likewise produced 6α - fluoro - 11β,17α,21-trihydroxy-16β-methyl-1,4-pregnadiene-3,20-dione.

EXAMPLE 10A

*6α-fluoro-11β,17α,21-trihydroxy-16β-methyl-4-pregnene-3,20-dione*

A solution of 1.1 grams of 6α-fluoro-11β,17α,21-trihydroxy-16β-methyl-4-pregnene-3,20-dione 21-acetate, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene chloride, and the extract was dried over sodium sulfate to give a solution of 6α-fluoro-11β,17α,21-trihydroxy-16β-methyl-4-pregnene-3,20-dione which was freed of solvent by evaporation.

EXAMPLE 11A

*6α-fluoro-11β,17α,21-trihydroxy-16β-methyl-1,4-pregnadiene-3,20-dione 21-acetate*

1.5 grams of 6α-fluoro-11β,17α,21-trihydroxy-16β-methyl-1,4-pregnadiene-3,20-dione was dissolved in twenty milliliters of pyridine and fifteen milliliters of acetic anhydride and the mixture heated at forty degrees centigrade for four hours. The solution was cooled and then slowly diluted with water. The precipitated steroid was removed by filtration, washed with water and dried to give 6α - fluoro - 11β,17α,21 - trihydroxy-16β-methyl-1,4-pregnadiene-3,20-dione 21-acetate.

6α - fluoro - 11β,17α,21 - trihydroxy - 16β - methyl - 1,4-pregnadiene-3,20-dione is converted to other 21-esters by reaction with the appropriate acid anhydride, acid chloride, or bromide or by other methods known in the art, e.g., by ester exchange, acid in the presence of an esterification catalyst, etc., to produce 6α-fluoro-11β,17α, 21-trihydroxy-16β-methyl-1,4-pregnadiene-3,20-dione 21-acylates which include those wherein the acyl radical of the 21-acylate group is the acyl radical of, for example, a lower aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3 - methyl - α - naphthoic, an aralkyl acid, e.g., phenylacetic, phenylpropionic, diphenyl- acetic, triphenylacetic, a dibasic acid (which can be converted to water soluble, e.g., sodium, salts), e.g., succinic, glutaric, α-methylglutaric, β-methylglutaric, β-β-dimethylglutaric, adipic, pimelic, suberic, a hydroxyacid, e.g., glycolic, lactic, citric, tartaric, d-maleric, d-glyceric, mannonic, gluconic, salicylic, 2,3,4-trimethoxybenzoic, α-naphthoxyacetic, or other acyl acid. Alternatively, the 21-hydroxy group is converted to the 21-phosphate ester group according to procedures known in the art, e.g., as described in U.S. 2,870,177.

Similarly, 6α-fluoro-11β,17α,21-trihydroxy-16β-methyl-4-pregnene-3,20-dione is converted to any of the other esters named in the paragraph following Example 11A by substituting 11β,17α,21-trihydroxy-16β-methyl-4-pregnene-3,20-dione as the starting compound in the acylation reaction.

EXAMPLE 12A

*6α-fluoro-16β-methyl-17α,21-dihydroxy-1,4-pregnadiene-3,11,20-trione 21-acetate*

To a solution of 2.5 millimoles of 6α,fluoro-11β,17α,21-trihydroxy-16β-methyl-1,4-pregnadiene-3,20-dione 21-acetate and two milliliters of pyridine in 75 milliliters of tertiary butanol was added 500 milligrams of N-bromoacetamide. The reaction mixture was maintained at room temperature for about sixteen hours whereupon the solution was diluted with fifty milliliters of water containing 500 milligrams of sodium sulfite, and the mixture was then concentrated at reduced pressure to about forty milliliters. The distillation residue was refrigerated, filtered, and the filter cake was washed with water and then dried. It consisted of 6α-fluoro-16β-methyl-17α,21-dihydroxy-1,4-pregnadiene-3,11,20-trione 21-acetate.

EXAMPLE 13A

*6α-fluoro-16β-methyl-17α,21-dihydroxy-4-pregnene-3,11,20-trione 21-acetate*

Following the procedure of Example 12A, but substituting 6α - fluoro - 11β,17α,21-trihydroxy-16β-methyl-4-pregnene-3,20-dione 21-acetate as starting compound, there is thus produced 6α-fluoro-16β-methyl-17α,21-dihydroxy-4-pregnene-3,11,20-trione 21-acetate.

Similarly, substituting another 21-acylate of 6α-fluoro-11β,17α - 21 - trihydroxy - 16β - methyl - 1,4 - pregnadiene-3,20-dione or 21-acylate of 6α-fluoro-11β,17α,21-trihydroxy-16β-methyl-4-pregnene-3,20-dione wherein the acyl radical is, e.g., that of an acid named in the paragraph following Example 11A, as the starting compound in the oxidation reaction described in Example 12A, there is thus produced the corresponding 21-acylate of 6α-fluoro-16β-methyl-17α,21-dihydroxy - 1,4 - pregnadiene-3, 11,20-trione and of 6α-fluoro-16β-methyl-17α,21-dihydroxy-4-pregnene-3,11,20-trione, respectively.

EXAMPLE 14A

*6α-fluoro-16β-methyl-17α,21-dihydroxy-1,4,9(11)-pregnatriene-3,20-dione 21-acetate*

To a solution of 8.5 grams of 6α-fluoro-11β,17α,21-trihydroxy - 16β-methyl - 1,4-pregnadiene-3,20-dione 21-acetate in 42.5 milliliters of pyridine was added 5.63 grams of N-bromoacetamide. After standing at room temperature for a period of fifteen minutes, the reaction solution was cooled to five to ten degrees centigrade and sulfur dioxide gas was passed over the surface of the solution while shaking the flask until the solution gave no color with acidified starch-iodide paper. During the addition of the sulfur dioxide, the reaction mixture became warm. The temperature was kept under thirty degrees centigrade by external cooling and by varying the rate of sulfur dioxide addition. Thereafter to the reaction mixture was added 400 milliliters of ice water and the resulting precipitate collected by filtration. This material was recrystallized from acetone-Skellysolve B hexanes to give 6α-fluoro-16β-methyl-17α,21-dihydroxy-1,4,9(11)-pregnatriene-3,20-dione 21-acetate.

EXAMPLE 15A

*6α-fluoro-16β-methyl-17α,21-dihydroxy-4,9(11)-pregnadiene-3,20-dione 21-acetate*

Following the procedure of Example 14A, but substituting 6α-fluoro-11β,17α,21-trihydroxy - 16β-methyl-4-pregnene-3,20-dione 21-acetate as the starting compound, there is thus produced 6α-fluoro-16β-methyl - 17α,21-dihydroxy-4,9(11)-pregnadiene-3,20-dione 21-acetate.

Similarly, substituting another 21-acylate of 6α-fluoro-11β,17α,21-trihydroxy-16β-methyl - 1,4-pregnadiene-3,20-dione or a 21-acylate of 6α-fluoro-11β-17α,21-trihydroxy-16β-methyl-4-pregnene-3,20-dione wherein the acyl radical is, e.g., that of an acid named in the paragraph following Example 11A, as the starting compound in the dehydration reaction described in Example 14A, there is thus produced the corresponding 21-acylate of 6α-fluoro-16β-methyl - 17α,21-dihydroxy-1,4,9(11)-pregnatriene-3,20-dione and of 6α-fluoro-16β-methyl-17α,21-dihydroxy-4,9(11)-pregnadiene-3,20-dione, respectively.

EXAMPLE 16A

*6α-fluoro-9α-bromo-11β,17α,21-trihydroxy-16β-methyl-1,4-pregnadiene-3,20-dione 21-acetate*

To a solution of 5.68 grams of 6α-fluoro - 16β-methyl-17α,21-dihydroxy - 1,4,9(11) - pregnatriene - 3,20-dione 21-acetate in 100 milliliters of methylene chloride and 250 milliliters of tertiary butyl alcohol was added a solution of fourteen milliliters of 72 percent perchloric acid in 100 milliliters of water followed by a solution of 2.34 grams of N-bromoacetamide in sixty milliliters of tertiary butyl alcohol. After stirring the reaction mixture for fifteen minutes, a solution of 2.8 grams of sodium sulfite in 140 milliliters of water was added and the reaction mixture was concentrated to a volume of about 500 milliliters under reduced pressure at about fifty degrees centigrade. The concentrate was cooled in an ice bath and while stirring 500 milliliters of water was added. After stirring for a period of one hour, the precipitated product was isolated by filtration, and the cake washed with water and air-dried to give 6α-fluoro-9α-bromo-11β,17α,21-trihydroxy - 16β-methyl - 1,4-pregnadiene - 3,20-dione 21-acetate.

EXAMPLE 17A

*6α-fluoro-9α-bromo-11β,17α,21-trihydroxy-16α-methyl-4-pregnene-3,20-dione 21-acetate*

Following the procedure of Example 16A, but substituting 6α-fluoro - 16β-methyl - 17α,21-dihydroxy - 4,9 (11)-pregnadiene-3,20-dione 21 - acetate as the starting compound, there is thus produced 6α-fluoro - 9α-bromo-11β,17α,21-trihydroxy - 16β-methyl - 4-pregnene - 3,20-dione 21-acetate.

Similarly, substituting another 21-acylate of 6α-fluoro-16β-methyl - 17α,21-dihydroxy - 1,4,9(11)-pregnatriene-3,20-dione or a 21-acylate of 6α-fluoro-17α,21-dihydroxy-16β-methyl-4,9(11)-pregnadiene - 3,20-dione wherein the acyl radical is, e.g., that of an acid named in the paragraph following Example 11A, as the starting compound in the reaction described in Example 16A, there is thus produced the corresponding 21-acylate of 6α-fluoro-9α-bromo - 11β,17α,21-trihydroxy - 16β-methyl - 1,4-pregnadiene-3,20-dione and of 6α-fluoro-9α-bromo-11β,17α,21-trihydroxy - 16β-methyl - 4-pregnene-3,20-dione, respectively.

Substituting N-chlorosuccinimide for the N-bromoacetamide in the reactions described in Examples 16A and 17A and the paragraph following is productive of the corresponding 9α-chloro compounds, e.g., 6α-fluoro-9α-chloro - 11β,17α,21-trihydroxy - 16α-methyl - 1,4-pregnadiene-3,20-dione 21-acetate and 6α-fluoro-9α-chloro-11β, 17α,21-trihydroxy - 16β-methyl - 4-pregnene - 3,20-dione 21-acetate.

EXAMPLE 18A

*6α-fluoro-9β,11β-epoxy-17α,21-dihydroxy-16β-methyl-1,4-pregnadiene-3,20-dione 21-acetate*

To a solution of 6.78 grams of 6α-fluoro-9α-bromo-11β,17α,21-trihydroxy - 16β-methyl-1,4-pregnadiene-3,20-dione 21-acetate in 175 milliliters of acetone was added 6.78 grams of potassium acetate and the resulting suspension was heated under reflux for a period of seventeen hours. The mixture was then concentrated to approximately sixty milliliters volume at reduced pressure on the steam bath, diluted with water and extracted with methylene chloride. The methylene chloride extracts were combined, washed with water, dried over anhydrous sodium sulfate and evaporated. The residue was redissolved in methylene chloride and chromatographed over 500 grams of Florisil anhydrous magnesium silicate. The column was eluted with one-liter portions of hexanes (Skellysolve B) containing increasing proportions of acetone. There was thus eluted 6α-fluoro-9β,11β-epoxy-16β-methyl-17α,21-dihydroxy - 1,4-pregnadiene-3,20-dione 21-acetate which was freed of solvent by evaporation of the eluates.

EXAMPLE 19A

*6α-fluoro-9β,11β-epoxy-16β-methyl-17α,21-dihydroxy-4-pregnene-3,20-dione 21-acetate*

Following the procedure of Example 18A, but substituting 6α-fluoro-9α-bromo - 11β,17α,21-trihydroxy-16β-methyl - 4-pregnene - 3,20-dione 21-acetate as the starting compound, there is thus produced 6α-fluoro-9β,11β-epoxy-16β-methyl - 17α,21-dihydroxy - 4-pregnene-3,20-dione 21-acetate.

Similarly, substituting another 21-acylate of 6α-fluoro-9α-bromo - 11β,17α,21 - trihydroxy - 16β-methyl - 1,4-pregnadiene-3,20-dione or a 21-acylate of 6α-fluoro-9α-bromo - 11β,17α,21-trihydroxy - 16β-methyl-4-pregnene-3,20-dione wherein the acyl radical is, e.g., that of an acid named in the paragraph following Example 11A, as the starting compound in the reaction described in Example 18A, there is thus produced the corresponding 21-acylate of 6α-fluoro - 9β,11β-epoxy-16β-methyl - 17α,21-dihydroxy - 1,4-pregnadiene-3,20-dione and of 6α-fluoro-9β,11β - epoxy-16β-methyl-17α,21-dihydroxy-4-pregnene-3,20-dione, respectively.

EXAMPLE 20A

*6α,9α-difluoro-11β,17α,21-trihydroxy-16β-methyl-1,4-pregnadiene-3,20-dione 21-acetate*

To approximately 1.3 grams of hydrogen fluoride contained in a polyethylene bottle and maintained at minus sixty degrees centigrade was added 2.3 milliliters of tetrahydrofuran and then a solution of 500 milligrams (0.0012 mole) of 6α-fluoro-9β,11β-epoxy-16β - methyl-17α,21-dihydroxy - 1,4-pregnadiene - 3,20-dione 21-acetate in two milliliters of methylene chloride. The steroid solution was rinsed in with an additional one milliliter of methylene chloride. The light red colored solution was then kept at approximately minus thirty degrees centigrade for one hour and at minus ten degrees at two hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 milliliters. The solution was chromatographed over 130 grams of Florisil anhydrous magnesium silicate. The column was developed with 260-milliliter portions of hexanes (Skellysolve B) containing increasing proportions of acetone. There was thus eluted 6α,9α - difluoro - 11β,17α,21 - trihydroxy - 16β - methyl-1,4-pregnadiene-3,20-dione 21-acetate which was freed of solvent by evaporation of the eluate fractions.

EXAMPLE 21A

*6α,9α - difluoro - 11β,17α,21 - trihydroxy - 16β - methyl-4-pregnene-3,20-dione 21-acetate*

Following the procedure of Example 20A, but substituting 6α - fluoro-9β,11β - epoxy - 16β-methyl - 17α,21-dihydroxy - 4-pregnene-3,20-dione 21-acetate as the starting compound, there is thus produced 6α,9α-difluoro-11β, 17α,21 - trihydroxy - 16β-methyl - 4-pregnene-3,20-dione 21-acetate.

Similarly, substituting another 21-acylate of 6α-fluoro-9β,11β - epoxy - 17α,21-dihydroxy - 16β-methyl - 1,4-pregnadiene - 3,20-dione or a 21-acylate of 6α-fluoro-9β, 11β - epoxy-17α,21-dihydroxy - 16β-methyl - 4-pregnene-3,20-dione wherein the acyl radical is, e.g., that of an acid named in the paragraph following Example 11A, as the starting compound in the reaction described in Example 20A, there is thus produced the corresponding 21-acylate of 6α,9α - difluoro - 11β,17α,21 - trihydroxy-16β - methyl-1,4 - pregnadiene - 3,20-dione and of 6α,9α-difluoro - 11β,17α,21-trihydroxy - 16β-methyl-4-pregnene-3,20-dione, respectively.

EXAMPLE 22A

*6α,9α - difluoro - 16β - methyl - 17α,21-dihydroxy - 1,4-pregnadiene-3,11,20-trione 21-acetate*

A solution was prepared containing one milliliter of acetic acid, fifty milligrams of 6α,9α-difluoro - 11β,17α, 21 - trihydroxy - 16β - methyl - 1,4-pregnadiene - 3,20-dione 21-acetate, twenty milligrams of chromic anhydride and one drop (approximately fifty milligrams) of water. This mixture was shaken several times at room temperature and allowed to stand for four hours. Thereafter it was poured into ten milliliters of water and refrigerated for twenty hours at about five degrees centigrade. The steroid which separated from the aqueous mixture was collected on filter paper and dried to give 6α,9α-difluoro-16β - methyl - 17α,21-dihydroxy - 1,4-pregnadiene-3,11,20-trione 21-acetate.

EXAMPLE 23A

*6α,9α - difluoro - 16β - methyl - 17α,21 - dihydroxy-4-pregnene-3,11,20-trione 21-acetate*

Following the procedure of Example 22A, but substituting 6α,9α - difluoro - 11β,17α,21 - trihydroxy - 16β-methyl-4-pregnene-3,20-dione 21-acetate as the starting compound, there is thus produced 6α,9α-difluoro-16β-methyl - 17α,21 - dihydroxy - 4-pregnene - 3,11,20-trione 21-acetate.

Similarly, substituting another 21-acylate of 6α,9α-difluoro - 11β,17α,21 - trihydroxy - 16β - methyl - 1,4-pregnadiene-3,20-dione or a 21-acylate of 6α,9α-difluoro-11β, 17α,21 - trihydroxy - 16β - methyl - 4-pregnene - 3,20-dione wherein the acyl radical is, e.g., that of an acid named in the paragraph following Example 11A, as the starting compound in the oxidation reaction described in Example 22A, there is thus produced the corresponding 21-acylate of 6α,9α - difluoro - 16β-methyl - 17α,21 - dihydroxy - 1,4-pregnadiene - 3,11,20-trione and of 6α,9α-difluoro - 16β - methyl - 17α,21 - dihydroxy - 4-pregnene-3,11,20-trione respectively.

EXAMPLE 24A

*6α,9α - difluoro - 11β,17α,21 - trihydroxy - 16β - methyl-1,4-pregnadiene-3,20-dione*

Three and one-quarter (3.25) grams of 6α,9α-difluoro-11β,17α,21 - trihydroxy - 16β-methyl - 1,4-pregnadiene-3,20-dione 21-acetate was dissolved in 325 milliliters of methanol, previously purged of air-oxygen by passing nitrogen through it for ten minutes and thereto was added a solution of 1.63 grams of potassium bicarbonate in thirty milliliters of water, similarly purged of oxygen. The mixture was allowed to stand at room temperature for a period of five hours in a nitrogen atmosphere, and then neutralized with 2.14 milliliters of acetic acid in forty milliliters of water. The mixture was concentrated to approximately one-third volume at reduced pressure on a sixty-degree-centigrade water-bath. Thereupon 250 milliliters of water was added and the mixture chilled. The crystalline product was collected on a filter, washed with water and dried to give 6α,9α-difluoro - 11β,17α,21-trihydroxy-16β-methyl-1,4-pregnadiene-3,20-dione.

EXAMPLE 25A

*6α,9α - difluoro - 11β,17α,21 - trihydroxy - 16β - methyl-4-pregnene-3,20-dione*

Following the procedure of Example 24A, but substituting 6α,9α - difluoro - 11β,17α,21 - trihydroxy - 16β-methyl-4-pregnene-3,20-dione 21-acetate as the starting compound, there is thus produced 6α,9α-difluoro - 11β, 17α,21-trihydroxy-16β-methyl-4-pregnene-3,20-dione.

Similarly, 6α,9α-difluoro-16β-methyl - 17α,21 - dihydroxy-4-pregnene-3,11,20-trione 21-acetate is hydrolyzed to 6α,9α-difluoro - 16β - methyl-17α,21-dihydroxy-4-pregnene-3,11,20-trione and 6α,9α - difluoro-16β-methyl-17α, 21-dihydroxy-1,4-pregnadiene - 3,11,20 - trione 21-acetate is hydrolyzed to 6α,9α-difluoro - 16β - methyl-17α,21-dihydroxy - 1,4 - pregnadiene-3,11,20-trione. The corresponding 9α-chloro compounds are similarly prepared by hydrolysis of their 21-acetates, e.g., 6α-fluoro-9α-chloro-11β,17α,21-trihydroxy-16β-methyl-1,4-pregnadiene - 3,20-dione and 6α-fluoro-9α-chloro-11β,17α,21 - trihydroxy-16β-methyl - 4 - pregnene-3,20-dione are prepared from 6α-fluoro-9α-chloro-11β,17α,21-trihydroxy - 16β - methyl-1,4-pregnadiene-3,20-dione 21-acetate and from 6α-fluoro-9α - chloro-11β,17α,21-trihydroxy-16β-methyl - 4 - pregnene-3,20-dione 21-acetate, respectively.

EXAMPLE 26A

*6α,9α-difluoro-11β,17α,21-trihydroxy-16β-methyl-1,4-pregnadiene-3,20-dione 21-propionate*

A solution was prepared containing fifty milligrams of 6α,9α-difluoro - 11β,17α,21 - trihydroxy-16β-methyl-1,4-pregnadiene-3,20-dione in one milliliter of pyridine and one milliliter of propionic anhydride. The solution was allowed to stand at room temperature for a period of 21 hours and was thereupon poured into ten milliliters of water. The reaction mixture was then extracted with three ten-milliliter portions of methylene chloride, the methylene chloride extracts were combined, washed with water, dried over anhydrous sodium sulfate and evaporated to give a residue of 6α,9α-difluoro-11β,17α,21-trihydroxy-16β-methyl-1,4-pregnadiene-3,20-dione 21-propionate.

EXAMPLE 27A

*6α,9α-difluoro-11β,17α,21-trihydroxy-16β-methyl-4-pregnene-3,20-dione 21-propionate*

Following the procedure of Example 26A, but substituting 6α,9α-difluoro-11β,17α,21-trihydroxy - 16β-methyl-4-pregnene-3,20-dione as starting compound, there is thus produced 6α,9α-difluoro-11β,17α,21-trihydroxy-16β-methyl-4-pregnene-3,20-dione 21-propionate.

Similarly, 6α,9α - difluoro-16β-methyl-17α,21 - dihydroxy-1,4-pregnadiene-3,11,20-trione is converted to 6α, 9α-difluoro - 16β - methyl-17α,21-dihydroxy-1,4-pregnadiene-3,11,20-trione 21-propionate and 6α,9α-difluoro-16β-methyl-17α,21-dihydroxy-4-pregnene - 3,11,20 - trione is converted to 6α,9α-difluoro-16β-methyl-17α,21-dihydroxy-4-pregnene-3,11,20-trione 21-propionate.

Similarly, substituting another acylating agent for the propionic anhydride in the esterification of 6α,9α-difluoro-11β,17α,21-trihydroxy-16β-methyl - 1,4 - pregnadiene-3, 20-dione or 6α,9α-difluoro - 11β,17α,21-trihydroxy-16β-methyl-4-pregnene-3,20 - dione, e.g., in the manner described in paragraph following Example 11A, there is thus produced other 21-acylates of 6α,9α-difluoro-11β, 17α,21-trihydroxy-16β-methyl - 1,4 - pregnadiene - 3,20-dione and of 6α,9α-difluoro - 11β,17α,21 - trihydroxy-16β- methyl-4-pregnene-3,20-dione, respectively, wherein the acyl radical is, e.g., that of an acid named in the paragraph following Example 11A. The corresponding 11-keto compounds are similarly converted to their corresponding 21-acylate esters.

EXAMPLE 28A

*6α-fluoro-11β,17α,21-trihydroxy-16β-methyl-1,4-pregnadiene-3,20-dione 21-methanesulfonate*

A solution was prepared containing one gram (2.6 millimoles) of 6α-fluoro-11β,17α,21-trihydroxy - 16β-methyl-1,4-pregnadiene-3,20-dione in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until the aqueous layer had a pH of two to three, then washed again with cold sodium bicarbonate solution, water and finally dried over anhydrous sodium sulfate. Evaporation of the methylene chloride extract at reduced pressure left a residue of 6α-fluoro-11β,17α,21-trihydroxy-16β-methyl-1,4-pregnadiene-3,20-dione 21-methanesulfonate.

Similarly, substituting 6α-fluoro-11β,17α,21-trihydroxy-16β-methyl-4-pregnene-3,20-dione as the starting compound, there is thus produced 6α-fluoro-11β,17α,21-trihydroxy-16β-methyl - 4 - pregnene-3,20-dione 21-methanesulfonate. The corresponding 9α-chloro and 9α-fluoro 21-methanesulfonate compounds are similarly prepared.

EXAMPLE 29A

*6α-fluoro-11β,17α-dihydroxy-16β-methyl-21-iodo-1,4-pregnadiene-3,20-dione*

The crude 6α-fluoro-11β,17α,21 - trihydroxy-16β-methyl-1,4-pregnadiene-3,20-dione 21-methanesulfonate described in Example 28A was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one-third volume at reduced pressure. Ice and water were added and the precipitated product collected on a filter, washed with water and dried to yield 6α-fluoro-11β,17α-dihydroxy-16β-methyl-21-iodo-1,4 - pregnadiene-3,20-dione.

Similarly, substituting 6α-fluoro-11β,17α,21-trihydroxy-16β-methyl-4-pregnene-3,20-dione 21 - methanesulfonate as the starting compound, there is thus produced 6α-fluoro-11β,17α-dihydroxy - 16β - methyl - 21 - iodo-4-pregnene-3,20-dione. The 9α-chloro and 9α-fluoro analogues of both of these compounds are similarly prepared.

EXAMPLE 30A

*6α,21-difluoro-11β,17α-dihydroxy-16β-methyl-1,4-pregnadiene-3,20-dione*

One gram of 6α-fluoro-11β,17α-dihydroxy-16β-methyl-21-iodo-1,4-pregnadiene-3,20-dione was dissolved in 150 milliliters of boiling acetonitrile. After cooling to forty degrees centigrade, the solution was protected from light and 0.8 milliliter of a fifty percent aqueous solution of silver fluoride was added under stirring. Stirring was continued for one hour at about forty degrees centigrade, then 0.7 milliliter of silver fluoride solution was added. After another hour of stirring another 0.7 milliliter portion of aqueous silver fluoride solution was added. Heating and stirring was then continued for a period of two hours. The brown mixture was then filtered through a bed of diatomaceous earth (Celite) and the filtrate evaporated at reduced pressure at a bath temperature of fifty degrees centigrade. The brown residue was thoroughly extracted with two 100-milliliter portions of warm methylene chloride, the combined extracts washed with water and dried over anhydrous sodium sulfate. The dried solution was concentrated to approximately 100 milliliters and then chromatographed over fifty grams of magnesium silicate (Florisil). The column was eluted with hexanes containing increasing proportions of acetone to give 6α,21-difluoro-11β,17α-dihydroxy-16β-methyl - 1,4 - pregnadiene-3,20-dione.

In the same manner as given in Examples 28A to 30A, 6α9α - difluoro - 11β,17α,21-trihydroxy-16β-methyl - 1,4-pregnadiene-3,20-dione was converted to 6α9α,21-trifluoro-11β,17α-dihydroxy-16β-methyl-1,4-pregnadiene-3,20 - dione.

Similarly, substituting 6α-fluoro-11β,17α-dihydroxy-16β-methyl-21-iodo-4-pregnene-3,20-dione starting compound, there is thus produced 6α,21-difluoro-11β,17α-dihydroxy-16β-methyl-4-pregnene-3,20-dione. 6α,9α,21 - trifluoro - 11β,17α-dihydroxy - 16β-methyl-4-pregnene-3,20-dione is similarly prepared from 6α,9α-difluoro-11β,17α-dihydroxy-16β-methyl - 21-iodo-4-pregnene-3,20 - dione. The corresponding 9α-chloro compounds are similarly prepared.

EXAMPLE 31A

*6α,21-difluoro-11β,17α-dihydroxy-16β-methyl-1,4-pregnadiene-3,20-dione*

A solution of one gram of 6α-fluoro-11β,17α,21-trihydroxy-16β-methyl-1,4 - pregnadiene - 3,20-dione 21-methanesulfonate and 0.50 gram of anhydrous potassium fluoride in ten milliliters of dimethylsulfoxide was heated at 100 degrees centigrade for twelve hours. The cooled solution was diluted with water and then extracted with methylene chloride. The extracts were dried and chromatographed over magnesium silicate in the manner described in Example 30A to give substantially pure 6α,21-difluoro-11β,17α-dihydroxy-16β-methyl-1,4 - pregnadiene-3,20-dione.

EXAMPLE 32A

*6α,21-difluoro-16β-methyl-17α-hydroxy-1,4-pregnadiene 3,11,20-trione*

A solution was prepared containing 0.5 gram of 6α,21-difluoro-11β,17α-dihydroxy-16β-methyl-1,4 - pregnadiene 3,20-dione, 0.15 gram of chromic acid, ten milliliters of glacial acetic acid and one-half milliliter of water. This mixture was stirred and then maintained for eight hours at room temperature. Thereafter the mixture was poured into fifty milliliters of ice water, neutralized by the addition of dilute sodium hydroxide and the thus-obtained precipitate collected on a filter and recrystallized three times from a mixture of ethyl acetate and Skellysolve B hexanes to give 6α,21-difluoro-16β-methyl-17α-hydroxy-1,4-pregnadiene-3,11,20-trione.

In the same manner given in Example 32A, 6α,9α,21-trifluoro-11β,17α-dihydroxy-16β-methyl-1,4 - pregnadiene-3,20-dione was oxidized to 6α,9α-21-trifluoro-16β-methyl-17α-hydroxy-1,4-pregnadiene-3,11,20-trione.

Similarly, 6α,21 - difluoro-16β-methyl-17α-hydroxy-4-pregnene-3,11,20-trione is prepared from 6α,21-difluoro-11β,17α-dihydroxy-16β-methyl-4-pregnene-3,20-dione and 6α,9α,21-trifluoro-16β-methyl-17α - hydroxy-4-pregnene-3,11,20-trione is prepared from 6α,9α,21-trifluoro-11β,17α-dihydroxy-16β-methyl-4-pregnene-3,20-dione. The corresponding 9α-chloro compounds are similary prepared.

EXAMPLE 33A

*6α-fluoro-11β,17α-dihydroxy-16β-methyl-1,4-pregnadiene-3,20-dione*

150 milligrams of 6α-fluoro-11β,17α-dihydroxy-16β-methyl-21-iodo-1,4-pregnadiene-3,20-dione was slurried with five milliliters of acetic acid and stirred for a period of 45 minutes. Then an aqueous solution of 250 milligrams of sodium thiosulfate pentahydrate was added causing the iodine color to disappear. Additional water was added (fifty milliliters) and the mixture extracted with three 25-milliliter portions of methylene chloride. The methylene chloride extracts were combined, washed with water and cold sodium bicarbonate solution until all acetic acid was neutralized. After drying over anhydrous sodium sulfate, the solution was concentrated to approximately fifteen milliliters and chromatographed over ten grams of magnesium silicate (Florisil). The column was developed with hexanes containing increasing proportions of acetone, to give substantially pure 6α-fluoro-11β-17α-dihydroxy-16β-methyl-1,4-pregnadiene-3,20-dione.

Following the procedure of Example 33A, 6α,9α-difluoro-11β,17α-dihydroxy-16β-methyl-21-iodo-1,4 - pregnadiene-3,20-dione was converted to 6α,9α-difluoro-11β,-17α-dihydroxy-16β-methyl-1,4-pregnadiene-3,20-dione.

Similarly, 6α-fluoro-11β,17α - dihydroxy-16β-methyl-4-pregnene-3,20-dione is prepared from 6α-fluoro-11β,17α-dihydroxy-16β - methyl-21-iodo-4 - pregnene-3,20-dione and 6α,9α-difluoro-11β,17α-dihydroxy-16β - methyl - 4-pregnene-3,20-dione from 6α,9α-difluoro - 11β,17α-dihydroxy-16β-methyl - 21-iodo-4-pregnene-3,20-dione. The corresponding 9α-chloro compounds are similarly prepared.

EXAMPLE 34A

*6α-fluoro-16β-methyl-17α-hydroxy-1,4-pregnadiene-3,11,20-trione*

A mixture was prepared containing 0.3 gram of 6α-fluoro - 11β,17 α- dihydroxy-16β-methyl-1,4-pregnadiene-3,20-dione, 100 milligrams of chromic anhydride, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus-obtained precipitate collected on a filter and dried to give 6α-fluoro-16β-methyl-17α-hydroxy - 1,4-pregnadiene-3,11,20-trione.

Following the procedure of Example 34A, 6α,9α-difluoro-11β,17α-dihydroxy-16β - methyl-1,4 - pregnadiene-3,20-dione was oxidized to 6α,9α-difluoro-16β-methyl-17α-hydroxy-1,4-pregnadiene-3,11,20-trione.

Similarly, 6α-fluoro-16β-methyl - 17α-hydroxy - 4-pregnene-3,11,20-trione is prepared from 6α-fluoro-11β,17α-dihydroxy - 16β - methyl-4-pregnene-3,20-dione and 6α,9α - difluoro - 16β-methyl-17α-hydroxy-4-pregnene-3,11,20-trione is prepared from 6α,9α-difluoro - 11β,17α-dihydroxy - 16β - methyl - 4 - pregnene-3,20-dione. The corresponding 9α-chloro compounds are similarly prepared.

We claim:

1. 6α - fluoro - 11β,17α,21 - trihydroxy-16β-methyl-4-pregnene-3,20-dione.
2. 6α - fluoro - 11β,17α,21 - trihydroxy-16β-methyl-4-pregnene-3,20-dione 21-acylate wherein the acyl radical is that of a hydrocarbon carboxylic acid containing from one to twelve carbon atoms, inclusive.
3. 6α - fluoro - 11β,17α,21 - trihydroxy-16β-methyl-4-pregnene-3,20-dione 21-acetate.
4. 6α - fluoro - 16β - methyl - 17α,21-dihydroxy-4-pregnene-3,11,20-trione 21-acetate.
5. 6α - fluoro - 16β - methyl - 17α,21 - dihydroxy-4-pregnene-3,11,20-trione.
6. 6α - fluoro - 9α - halo-11β,17α,21-trihydroxy-16β-methyl-4-pregnene-3,20-dione 21-acylate wherein the acyl radical is that of a hydrocarbon carboxylic acid containing from one to twelve carbon atoms, inclusive, and wherein the halogen has an atomic weight from 19 to 36, inclusive.
7. 6α,9α - difluoro - 11β,17α,21-trihydroxy-16β-methyl-4-pregnene-3,20-dione 21-acetate.
8. 6α,9α - difluoro - 11β,17α,21-trihydroxy-16β-methyl-4-pregnene-3,20-dione.
9. 6α - fluoro - 16β - methyl - 17α,21-dihydroxy-1,4-pregnadiene-3,11,20-trione 21-acetate.
10. 6α - fluoro - 16β - methyl - 17α,21-dihydroxy-1,4-pregnadiene-3,11,20-trione.
11. 6α - fluoro - 11β,17α,21-trihydroxy-16β-methyl-1,4-pregnadiene-3,20-dione.
12. 6α - fluoro - 11β,17α,21 - trihydroxy - 16β-methyl-1,4 - pregnadiene-3,20-dione 21-acylate wherein the acyl radical is that of a hydrocarbon carboxylic acid containing from one to twelve carbon atoms, inclusive.
13. 6α - fluoro - 11β,17α,21 - trihydroxy - 16β-methyl-1,4-pregnadiene-3,20-dione 21-acetate.
14. 6α - fluoro - 9α - halo - 11β,17α,21 - trihydroxy-16β-methyl-1,4-pregnadiene-3,20-dione 21-acetate wherein the acyl radical is that of a hydrocarbon carboxylic acid containing from one to twelve carbon atoms, inclusive, and wherein the halogen has an atomic weight from 19 to 36, inclusive.
15. 6α,9α - difluoro - 11β,17α,21 - trihydroxy - 16β-methyl-1,4-pregnadiene-3,20-dione 21-acetate.
16. 6α,9α - difluoro - 11β,17α,21 - trihydroxy-16β-methyl-1,4-pregnadiene-3,20-dione.
17. 6α,21 - difluoro - 11β,17α - dihydroxy-16β-methyl-1,4-pregnadiene-3,20-dione.
18. 6α,9α,21 - trifluoro-11β,17α-dihydroxyl-16β-methyl-1,4-pregnadiene-3,20-dione.
19. 6α,21 - difluoro - 11β,17α - dihydroxy-16β-methyl-4-pregnene-3,20-dione.
20. 6α,9α,21 - trifluoro-11β,17α-dihydroxy-16β-methyl-4-pregnene-3,20-dione.
21. 6α-fluoro-11β,17α-dihydroxy-16β-methyl - 4 - pregnene-3,20-dione.
22. 6α,9α - difluoro - 11β,17α-dihydroxy-16β-methyl-4-pregnene-3,20-dione.
23. 6α - fluoro - 11β,17α - dihydroxy-16β-methyl-1,4-pregnadiene-3,20-dione.
24. 6α,9α - difluoro - 11β,17α-dihydroxy-16β-methyl-1,4-pregnadiene-3,20-dione.
25. 6α-fluoro-16β-methyl steroid compound of the formula:

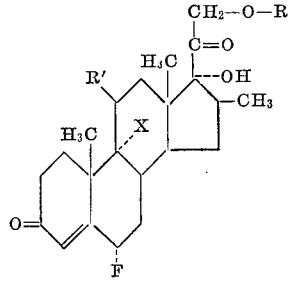

wherein R is a member of the group consisting of hydrogen and the acyl radical of a hydrocarbon carboxylic acid containing from one to twelve carbon atoms, inclusive; R' is a member of the group consisting of β-hydroxy and keto; and X is a member of the group consisting of hydrogen, fluorine and chlorine.

26. 16β-methyl steroid compounds of the formula:

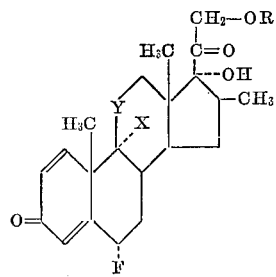

wherein R is a member of the group consisting of hydrogen and the acyl radical of a hydrocarbon carboxylic acid containing from one to twelve carbon atoms, inclusive; Y is a member of the group consisting of β-hydroxymethylene and carbonyl; and X is a member of the group consisting of hydrogen, fluorine and chlorine.

27. A compound selected from the group consisting of 6α,21 - difluoro - 16β-methyl-17α-hydroxy-4-pregnene-3,20-dione represented by the formula:

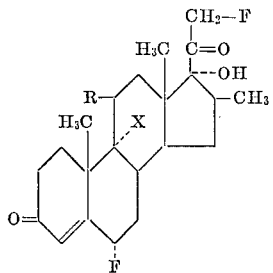

wherein X is selected from the group consisting of chlorine, fluorine and hydrogen atoms and R is selected from the group consisting of β-hydroxy and keto, and the corresponding $\Delta^{1,4}$ compounds.

28. A compound selected from the group consisting of 6α - fluoro - 16β-methyl-17α-hydroxy-4-pregnene-3,20-dione represented by the formula:

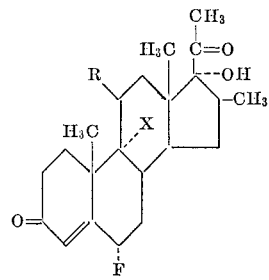

wherein X is selected from the group consisting of chlorine, fluorine and hydrogen atoms and R is selected from the group consisting of β-hydroxy and keto, and the corresponding $\Delta^{1,4}$ compounds.

References Cited

UNITED STATES PATENTS 3,055,922  9/1962  Levinson _____ 260—397.45
3,207,751  9/1965  Pinson, Jr. _____ 260—239.55

ELBERT L. ROBERTS, Primary Examiner

U.S. Cl. X.R.

260—239.55, 397.1, 397.3, 397.47, 239.5

UNITED STATES PATENT OFFICE
CERTIFICATE OF CORRECTION

Patent No. 3,557,158                    Dated January 19, 1971

Inventor(s) Frank H. Lincoln, William P. Schneider and George B. Spero

It is certified that error appears in the above-identified patent and that said Letters Patent are hereby corrected as shown below:

Column 8, line 63, for "-yuoro-" read -- -fluoro- --. C 11, line 26, for "-6-" read -- -16- --. Column 11, line 39, "-methylprogresterone." read -- -methylprogesterone.--. Col 11, line 54, for "2-21-" read --2,21- --. Column 13, line 6 "are" read --and--. Column 15, line 39, for "Rhizopos" read --Rhizopus--. Column 17, line 56, for "-6α-" read -- -6β- - Column 18, line 32, for "lithiumaluminum" read --lithium aluminum--. Column 19, line 46, for "-prednadiene-" read -- -pregnadiene- --. Column 19, line 53, for "affnis," read --affinis,--. Column 25, line 36, for "17,21-" read --17α,2 Column 26, line 47, for "fity" read --fifty--. Column 26, 1 55, for "-11β,16α-" read -- -11β,17α- --. Column 27, line 1 "millilites" read --milliliters--. Column 28, line 6, for 1 "-3,11.20-" read -- -3,11,20- --. Column 28, line 18, for " read --16β- --. Column 29, line 74, for "5α,11β,-21-" read --5α,11β,21- --. Column 30, line 8, for "5α,11β-21-" read --5α,11β,21- --. Column 31, line 17, for "-11β,17α-21-" rea -- -11β,17α,21- --. Column 32, line 3, for "β-β-" read --β, Column 32, line 21, for "6α,fluoro-" read --6α-fluoro- --. umn 32, line 45, for "-11β,17α-21-" read -- -11β,17α,21- --. umn 33, line 14, for "-11β-17α,21-" read -- -11β,17α,21- --. umn 36, lines 71 and 72, for "in paragraph" read --in the pa graph--. Column 38, line 9, for "6α9α-" read --6α,9α- --. umn 38, line 10, for "6α9α," read --6α,9α,--. Column 40, li for "21-acetate" read --21-acylate--. Column 40, line 21, f "dihydroxyl-" read --dihydroxy- --.

Signed and sealed this 31st day of August 1971.

(SEAL)
Attest:

EDWARD M. FLETCHER, JR.           ROBERT GOTTSCHALK
Attesting Officer                 Acting Commissioner of Pate